(12) United States Patent
Li et al.

(10) Patent No.: US 11,386,692 B2
(45) Date of Patent: Jul. 12, 2022

(54) DISPLAY PANEL, DISPLAY APPARATUS, TEXTURE RECOGNITION METHOD AND ELECTRONIC DEVICE

(71) Applicant: BOE TECHNOLOGY GROUP CO., LTD., Beijing (CN)

(72) Inventors: Yangbing Li, Beijing (CN); Haisheng Wang, Beijing (CN); Xiaoliang Ding, Beijing (CN); Pengpeng Wang, Beijing (CN); Jiabin Wang, Beijing (CN); Ping Zhang, Beijing (CN); Likai Deng, Beijing (CN); Yapeng Li, Beijing (CN); Chihjen Cheng, Beijing (CN); Yanling Han, Beijing (CN); Xueyou Cao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 164 days.

(21) Appl. No.: 16/764,951

(22) PCT Filed: Nov. 5, 2019

(86) PCT No.: PCT/CN2019/115732
§ 371 (c)(1),
(2) Date: May 18, 2020

(87) PCT Pub. No.: WO2020/094016
PCT Pub. Date: May 14, 2020

(65) Prior Publication Data
US 2020/0349334 A1   Nov. 5, 2020

(30) Foreign Application Priority Data
Nov. 7, 2018   (CN) .......................... 201811321319.9

(51) Int. Cl.
*G02F 1/1335*   (2006.01)
*G06V 40/13*   (2022.01)
*G02F 1/1333*   (2006.01)

(52) U.S. Cl.
CPC ...... *G06V 40/1318* (2022.01); *G02F 1/13338* (2013.01); *G02F 1/133512* (2013.01)

(58) Field of Classification Search
CPC ............. G06K 9/0004; G02F 1/13338; G02F 1/133512; G06F 3/042; G06F 3/0304; G06V 40/1318
See application file for complete search history.

(56) References Cited

U.S. PATENT DOCUMENTS

2007/0263914 A1   11/2007   Tibbetts
2010/0183200 A1   7/2010   Wu
(Continued)

FOREIGN PATENT DOCUMENTS

CN   101400974 A   4/2009
CN   106970495 A   7/2017
(Continued)

OTHER PUBLICATIONS

Notification of the First Office Action issued in Chinese Patent Application 201811321319.9, dated Dec. 4, 2019; with English translation.
(Continued)

*Primary Examiner* — Antonio Xavier
(74) *Attorney, Agent, or Firm* — McDermott Will & Emery LLP

(57) ABSTRACT

A display panel has a light-exit side and a non-light-exit side opposite to the light-exit side. A direction pointing to the non-light-exit side from the light-exit side is a first direction. In the first direction, the display panel includes a coded aperture mask layer and an optical sensing layer. The coded
(Continued)

aperture mask layer includes a plurality of first light-transmission portions and a plurality of first light-shielding portions. The coded aperture mask layer is configured to form at least one part of a coded aperture array. The optical sensing layer includes a plurality of optical sensors. The optical sensing layer is configured to receive texture recognition light passed through the coded aperture array and convert optical signals of the texture recognition light into electrical signals. The texture recognition light is light carrying information about a texture to be recognized.

18 Claims, 10 Drawing Sheets

(56) References Cited

U.S. PATENT DOCUMENTS

2017/0220840 A1* 8/2017 Wickboldt .......... H01L 27/3234
2017/0220844 A1* 8/2017 Jones ................... A61B 5/1172
2018/0076256 A1 3/2018 Jiang et al.
2018/0300525 A1 10/2018 Fourre et al.

FOREIGN PATENT DOCUMENTS

| CN | 108496180 A | 9/2018 |
| CN | 108694379 A | 10/2018 |
| CN | 108764147 A | 11/2018 |
| EP | 0 886 958 B1 | 4/2001 |
| EP | 1 437 677 A1 | 7/2004 |
| EP | 3 367 301 A1 | 8/2018 |

OTHER PUBLICATIONS

Notification of the Second Office Action issued in Chinese Patent Application 201811321319.9, dated Jul. 24, 2020; with English translation.

* cited by examiner

DISPLAY PANEL, DISPLAY APPARATUS, TEXTURE RECOGNITION METHOD AND ELECTRONIC DEVICE

CROSS-REFERENCE TO RELATED APPLICATIONS

The present application is a national phase entry under 35 USC 371 of International Patent Application No. PCT/CN2019/115732 filed on Nov. 5, 2019, which claims priority to Chinese Patent Application No. 201811321319.9, filed with the State Intellectual Property Office of People's Republic of China on Nov. 7, 2018, the contents of which are incorporated herein by reference in their entirety.

TECHNICAL FIELD

The present disclosure relates to the technical field of display technologies, and in particular to a display panel, a display apparatus, a texture recognition method and an electronic device.

BACKGROUND

The principle of the optical fingerprint recognition technology is that light reflected by ridges and valleys of a fingerprint is converted into electrical signals, the electrical signals are then converted into an image, and the converted image is compared with a source image. As a result, the fingerprint recognition is implemented. The optical fingerprint recognition technology can be applied in terminal devices such as mobile phones to realize functions such as unlocking of the terminal devices or e-payment.

SUMMARY

In one aspect, a display panel is provided. The display panel has a light-exit side and a non-light-exit side opposite to the light-exit side. A direction pointing to the non-light-exit side from the light-exit side is a first direction. In the first direction, the display panel includes a coded aperture mask layer and an optical sensing layer. The coded aperture mask layer includes a plurality of first light-transmission portions and a plurality of first light-shielding portions. The coded aperture mask layer is configured to form at least one part of a coded aperture array. The optical sensing layer includes a plurality of optical sensors. The optical sensing layer is configured to receive texture recognition light passed through the coded aperture array and convert optical signals of the texture recognition light into electrical signals, wherein the texture recognition light is light that carries information about a texture to be recognized.

In some embodiments, the display panel further includes a coded aperture fit layer disposed on a side of the optical sensing layer proximate to the light-exit side. The coded aperture fit layer includes a second light-transmission portion and a second light-shielding portion, wherein orthographic projections of the plurality of first light-shielding portions on a photosensitive surface of the optical sensing layer at least partially overlap an orthographic projection of the second light-transmission portion on the photosensitive surface of the optical sensing layer, so that the coded aperture mask layer cooperates with the coded aperture fit layer to form the coded aperture array.

In some embodiments, the display panel is an active light-emitting display panel, and the active light-emitting display panel includes a first base and a first pixel layer disposed above the first base. The first pixel layer includes a plurality of light-emitting portions and a light-transmission pixel defining layer configured to isolate two adjacent light-emitting portions. The coded aperture fit layer includes at least part of the first pixel layer, the plurality of light-emitting portions are configured to form the second light-shielding portion of the coded aperture fit layer, and the pixel defining layer is configured to form the second light-transmission portion of the coded aperture fit layer. A side of the first pixel layer away from the first base is the light-exit side of the active light-emitting display panel, and the optical sensing layer is disposed on a side of the first pixel layer away from the light-exit side.

In some embodiments, the coded aperture mask layer is located on a side of the first pixel layer proximate to the light-exit side. The orthographic projections of the plurality of first light-shielding portions on the photosensitive surface are within an orthographic projection of the pixel defining layer on the photosensitive surface. Orthographic projections of a part of the plurality of first light-transmission portions on the photosensitive surface are within the orthographic projection of the pixel defining layer on the photosensitive surface, and orthographic projections of another part of the plurality of first light-transmission portions on the photosensitive surface are within orthographic projections of the plurality of light-emitting portions on the photosensitive surface.

In some embodiments, the coded aperture mask layer is located between the first pixel layer and the optical sensing layer. Orthographic projections of the plurality of light-emitting portions on the photosensitive surface overlap a part of the orthographic projections of the plurality of first light-shielding portions on the photosensitive surface, or orthographic projections of the plurality of light-emitting portions on the photosensitive surface overlap a part of orthographic projections of the plurality of first light-transmission portions on the photosensitive surface, or orthographic projections of the plurality of light-emitting portions on the photosensitive surface overlap a part of the orthographic projections of the plurality of first light-shielding portions on the photosensitive surface and a part of orthographic projections of the plurality of first light-transmission portions on the photosensitive surface.

In some embodiments, the optical sensing layer is disposed between the first pixel layer and the first base; or, the optical sensing layer is disposed on a side of the first base away from the first pixel layer.

In some embodiments, the active light-emitting display panel further includes a light blocking layer. The light blocking layer is disposed on a side of the optical sensing layer away from the first pixel layer. The light blocking layer is configured to block light that enters the active light-emitting display panel from the non-light-exit side of the active light-emitting display panel.

In some embodiments, orthographic projections of the plurality of optical sensors on the first base are within an orthographic projection of the light blocking layer on the first base.

In some embodiments, the display panel is a passive light-emitting display panel, and the passive light-emitting display panel includes a second base, a third base, a liquid crystal layer, a plurality of filter portions and a light-shielding pattern configured to isolate two adjacent filter portions. The second base and the third base are opposite to each other. The liquid crystal layer is disposed between the second base and the third base. The plurality of filter portions are disposed on a surface of the second base or the third base proximate to the liquid crystal layer. The light-shielding pattern is configured to isolate two adjacent filter portions. The plurality of filter portions are configured to form the second light-transmission portion of the coded aperture fit layer, and the light-shielding pattern is configured to form the second light-shielding portion of the coded aperture fit layer. The third base is closer to the light-exit side of the passive light-emitting display panel than the second base, and the optical sensing layer is disposed on a side of the second base proximate to or away from the liquid crystal layer.

In some embodiments, the coded aperture mask layer is configured to form the coded aperture array.

In some embodiments, the coded aperture mask layer includes a light-transmission substrate and a plurality of light-shielding coatings disposed on the substrate. The plurality of light-shielding coatings are configured to form the plurality of first light-shielding portions, and portions of the substrate not covered with the plurality of light-shielding coatings are configured to form the plurality of first light-transmission portions.

In some embodiments, the plurality of light-transmission portions of the coded aperture mask layer are hollow structures.

In another aspect, a display apparatus is provided. The display apparatus includes the display panel according to any one of the above embodiments.

In still another aspect, a texture recognition method is provided. The texture recognition method is applied to the display panel according to any one of the above embodiments. The texture recognition method includes: receiving the electrical signals transmitted by the plurality of optical sensors in the optical sensing layer, the electrical signals being converted by the plurality of optical sensors from the optical signals of the texture recognition light passed through the coded aperture array; obtaining an intermediate image of the texture to be recognized according to the electrical signals; and performing image restoration on the intermediate image according to a matrix of the coded aperture array to obtain a texture image.

In some embodiments, performing image restoration on the intermediate image according to a matrix of the coded aperture array to obtain a texture image, includes: calculating a matrix S of the texture image according to $S=D*A^{-1}$, where D represents a matrix of the intermediate image, A represents the matrix of the coded aperture array, $A^{-1}$ represents an inverse matrix of A, and $D*A^{-1}$ represents a convolution of D and $A^{-1}$.

In some embodiments, the texture recognition method further includes: comparing the texture image with a pre-stored source image.

In yet another aspect, a texture recognition device is provided. The texture recognition device includes a signal receiver and a processor. The signal receiver is configured to receive electrical signals transmitted by a plurality of optical sensors in an optical sensing layer, the electrical signals being converted by the plurality of optical sensors from optical signals of texture recognition light passed through a coded aperture array. The processor is configured to obtain an intermediate image of a texture to be recognized according to the electrical signals and then perform image restoration on the intermediate image according to a matrix of the coded aperture array to obtain a texture image.

In yet another aspect, a non-transitory computer-readable storage medium is provided. The computer-readable storage medium stores computer program instructions that, when executed by a processor, cause the processor to perform one or more of steps in the texture recognition method according to any one of the above embodiments.

In yet another aspect, an electronic device is provided. The electronic device includes the display panel according to any one of the above embodiments and the texture recognition device according to above embodiments. The display panel is coupled to the texture recognition device.

In yet another aspect, a computer program product is provided. The computer program product includes computer program instructions that, when executed by a computer, cause the computer to perform one or more of steps in the texture recognition method according to any one of the above embodiments.

In yet another aspect, a computer program is provided. The computer program, when executed by a computer, causes the computer to perform one or more of steps in the texture recognition method according to any one of the above embodiments.

BRIEF DESCRIPTION OF THE DRAWINGS

To describe the technical solutions of the present disclosure more clearly, drawings to be used in some embodiments of the present disclosure will be briefly introduced below. Apparently, the drawings to be described below are just drawings for some embodiments of the present disclosure. For a person of ordinary skill in the art, other drawings may be obtained according to those drawings. Additionally, the drawings to be described below may be considered as schematic views and are not intended to limit the actual size of products and the actual flow of methods involved in embodiments of the present disclosure.

DETAILED DESCRIPTION

The technical solutions in some embodiments of the present disclosure will be described clearly and completely with reference to the drawings below. Apparently, the embodiments to be described are merely some but not all of the embodiments of the present disclosure. All other embodiments obtained by a person of ordinary skill in the art based on the embodiments provided in the present disclosure shall be included in the protection scope of the present disclosure.

In describing some embodiments, "coupled" and "connected" and their derivatives may be used. For example, the term "connected" may be used in describing some embodiments to indicate that two or more components are in direct physical or electrical contact with each other. For another example, the term "coupled" may be used in describing some embodiments to indicate that two or more components are in direct physical or electrical contact. However, the term "coupled" or "communicatively coupled" may also mean that two or more components are not in direct contact with each other but still cooperate or interact with each other. The embodiments described herein are not necessarily limited to the content herein.

Figure 1:
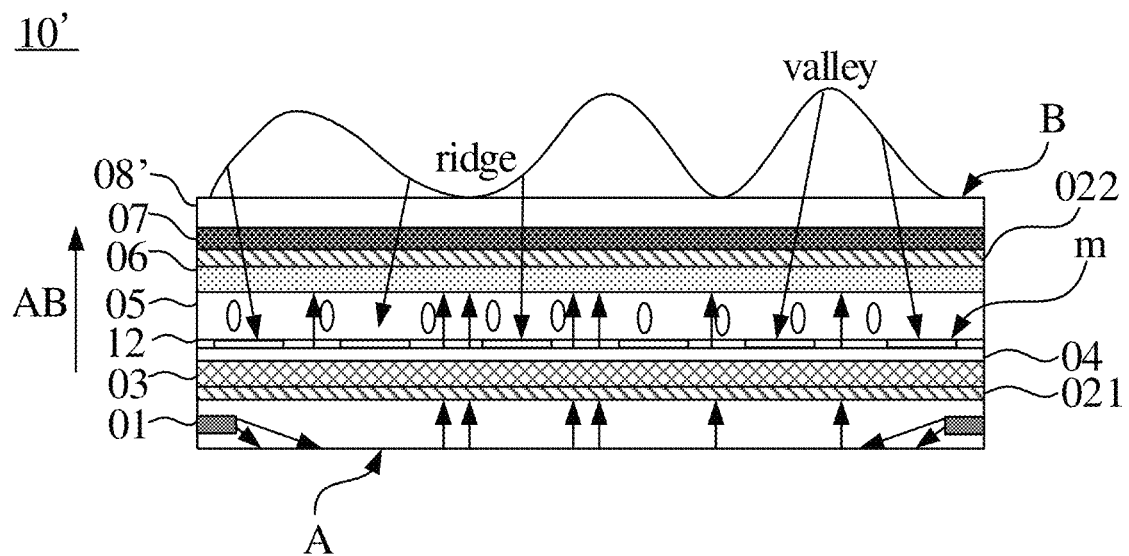
FIG. 1 is a sectional view showing a partial structure of a display panel, in accordance with the related technologies.

With reference to FIG. 1, in some related technologies, a structure of a display panel 10' with an optical fingerprint recognition function is that, along direction AB pointing to a light-exit side B from a non-light-exit side A of the display panel 10', the display panel 10' includes a backlight module 01, a first polarizer 021, a thin film transistor (TFT) substrate 03, an insulating layer 04, an optical sensing layer 12, a liquid crystal layer 05, a color filter substrate 06, a second polarizer 022, an optically clear adhesive (OCA) layer 07 and a cover sheet 08' in sequence. The optical sensing layer 12 includes a plurality of optical sensors.

The process of implementing optical fingerprint recognition by the display panel 10' is roughly described as follows: light emitted from the backlight module 01 passes through the first polarizer 021, the TFT substrate 03, insulating layer 04, the optical sensing layer 12, the liquid crystal layer 05, the color filter substrate 06, the second polarizer 022, the OCA layer 07 and the cover sheet 08' in sequence, and is directed to the light-exit side B. When a user's finger touches the screen, the fingerprint of the finger reflects light to the optical sensors in the optical sensing layer 12.

The light reflected by the fingerprint includes light reflected by ridges of the fingerprint and light reflected by valleys of the fingerprint. Since the ridges are convex textures in the fingerprint, the ridges are closer to the sensing surfaces of the optical sensors, and since the valleys are concave textures in the fingerprint, the valleys are farther away from the sensing surfaces of the optical sensors. Therefore, information received by the optical sensors of the light reflected by the ridges and the valleys is different. The optical sensors receive different light reflected by the ridges and valleys and convert light signals into electrical signals, and thus a fingerprint image containing information about the ridges and valleys is obtained. Subsequently, the fingerprint image is compared with a source image of the user's fingerprint stored in an electronic device (e.g., a mobile phone). In this way, it can be identified whether the fingerprint corresponding to the fingerprint image is the user's fingerprint.

During the fingerprint recognition process, since the light received by the optical sensors includes not only the light reflected by the ridges and valleys of the fingerprint, but also the light that does not carry information about the fingerprint, such as the ambient light and the light for display of the display panel, the fingerprint recognition process may be interfered by the light that does not carry information about the fingerprint, which makes the optical sensors not accurately recognize the light reflected by the ridges and valleys of the fingerprint. As a result, the fingerprint sensed by the optical sensing layer 12 is fuzzy or even unrecognizable.

Figure 2:
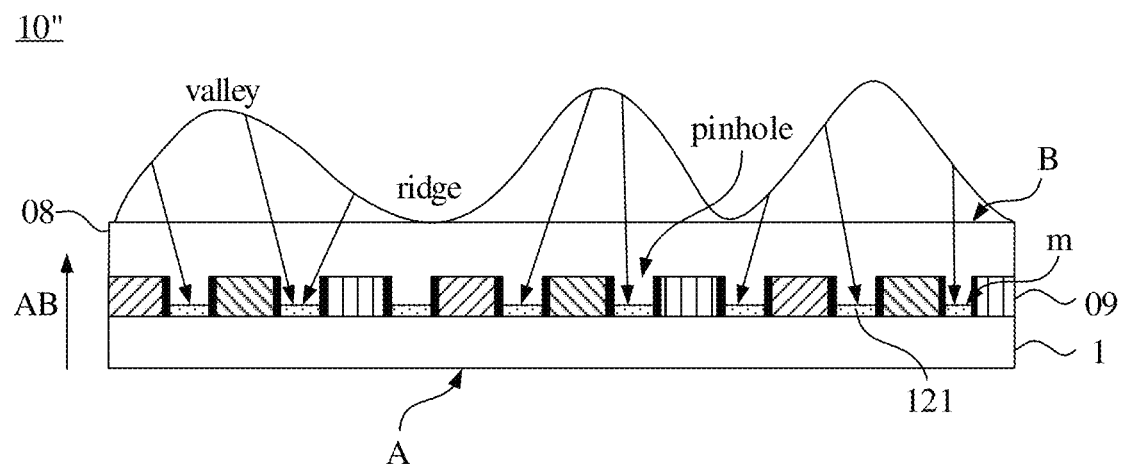
FIG. 2 is a sectional view showing a partial structure of another display panel, in accordance with the related technologies.

As shown in FIG. 2, in some other related technologies, a structure of another display panel 10" with an optical fingerprint recognition function is that, in direction AB pointing to a light-exit side B from a non-light-exit side A of the display panel 10", the display panel 10" includes a base 1, a pixel layer 09 and an encapsulation layer 08. Pinholes are formed between two adjacent sub-pixels of the display panel 10", and optical sensors 121 are provided at bottoms of the pinholes. Images of the fingerprint are formed on the optical sensors 121 in the pinholes by pinhole imaging. Since most of the ambient light is filtered by the pinholes when the light passes through the pinholes, the optical sensors 121 can accurately recognize the light reflected by the fingerprint, which ameliorates the problem that the fingerprint sensed by the optical sensors 12 is fuzzy.

However, the pinhole imaging technology has a high requirement in resolution and distribution density of the optical sensors, and the optical sensor is arranged between two adjacent sub-pixels, which makes the display panel 10" require a high PPI (Pixel Per Inch) to implement a fingerprint detection though pinhole imaging. As a result, this has higher requirements for the design and process of the display panel.

Figure 3:
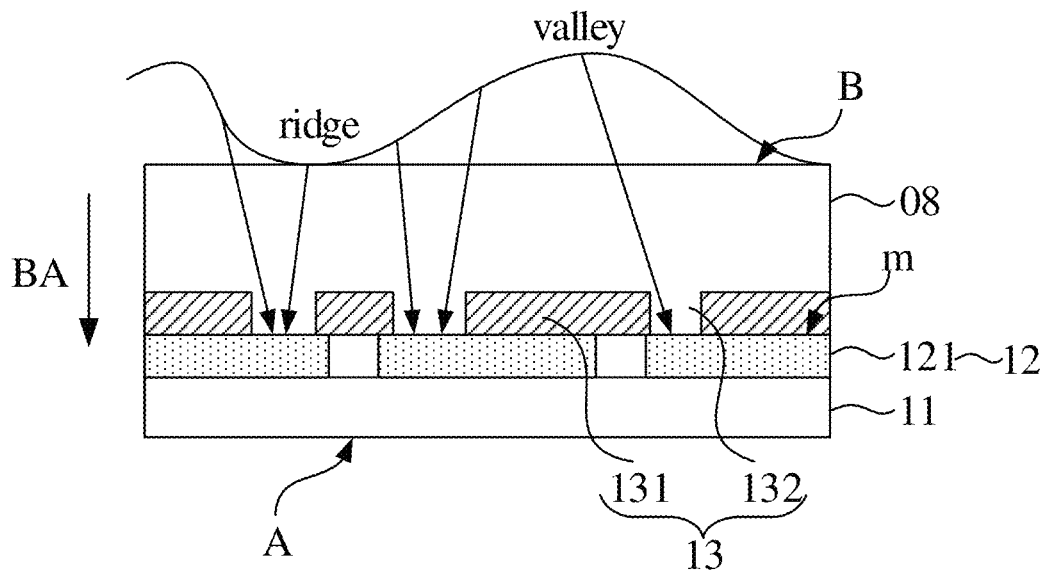
FIG. 3 is a sectional view showing a partial structure of a display panel, in accordance with some embodiments of the present disclosure.
Figure 4:
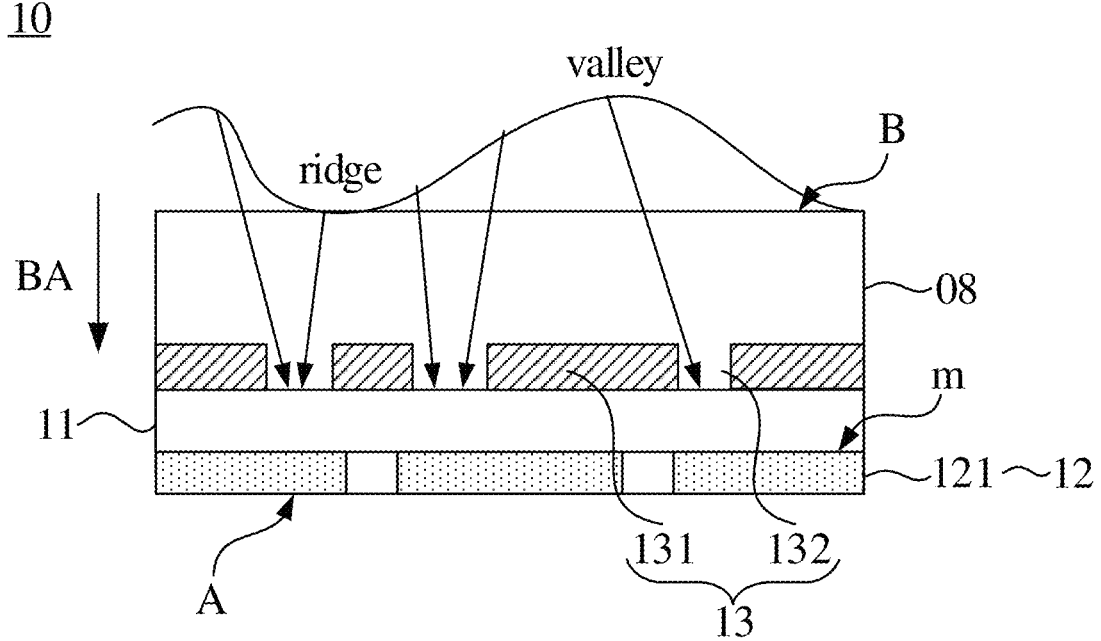
FIG. 4 is a sectional view showing a partial structure of another display panel, in accordance with to some embodiments of the present disclosure.
Figure 5:
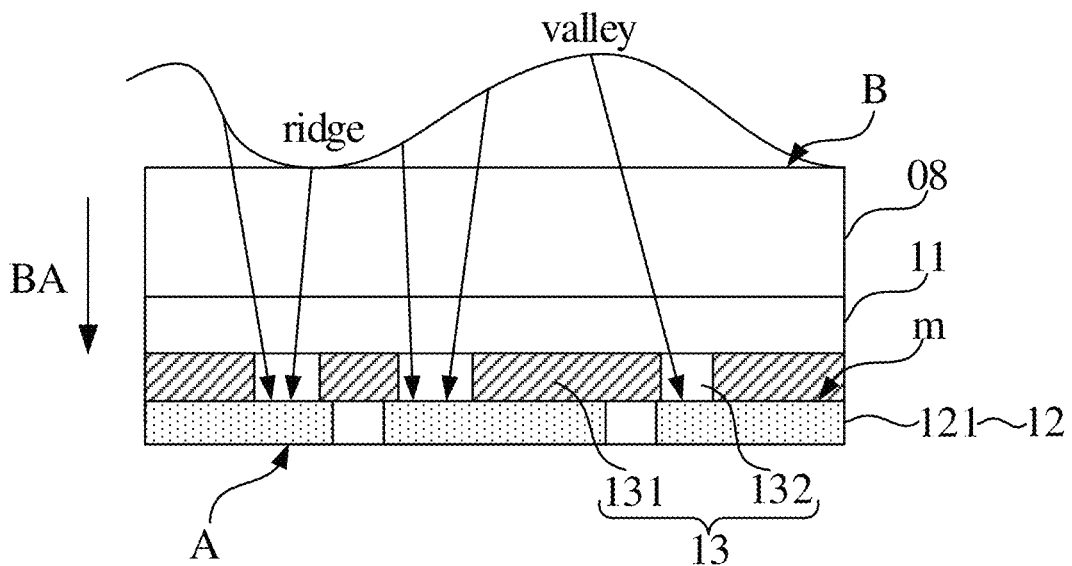
FIG. 5 is a sectional view showing a partial structure of yet another display panel, in accordance with some embodiments of the present disclosure.

For these reasons, as shown in FIGS. 3 to 5, some embodiments of the present disclosure provide a display panel 10. The display panel 10 has a light-exit side B and a non-light-exit side A opposite to the light-exit side B. A direction that points to the non-light-exit side A from the light-exit side B is a first direction BA. In the first direction BA, the display panel 10 includes a coded aperture mask layer 13 and an optical sensing layer 12. The coded aperture mask layer 13 includes a plurality of first light-transmission portions 132 and a plurality of first light-shielding portions 131. The coded aperture mask layer 13 is configured to form at least one part of a coded aperture array. The optical sensing layer 12 includes a plurality of optical sensors 121. The optical sensing layer 12 is configured to receive texture recognition light passed through the coded aperture array, and convert optical signals of the texture recognition light into electrical signals.

The texture recognition light is light that carries information about a texture to be recognized. In the embodiments of the present disclosure, the display panel 10 may be applied to the recognition of various textures, for example, fingerprint, palm print or the like. Exemplarily, in a case where the texture to be recognized is the fingerprint, the texture recognition light is light carrying information about the fingerprint texture. That is, the texture recognition light includes light reflected by ridges and valleys of the fingerprint.

In some embodiments, as shown in FIGS. 3 to 5 and FIGS. 9 to 12, the display panel 10 further includes a first base 11. The coded aperture mask layer 13 and the optical sensing layer 12 may be disposed on the first base 11. Additionally, the display panel 10 may further include an encapsulation layer 08. For example, the encapsulation layer 08 is a cover sheet, an encapsulation film or the like. The surface of the encapsulation layer 08 facing away from the first base 11 may be used as the light-exit surface of the display panel 10. During the fingerprint recognition of the display panel 10, the light-exit surface is configured to be in contact with the texture to be recognized.

Figure 6:
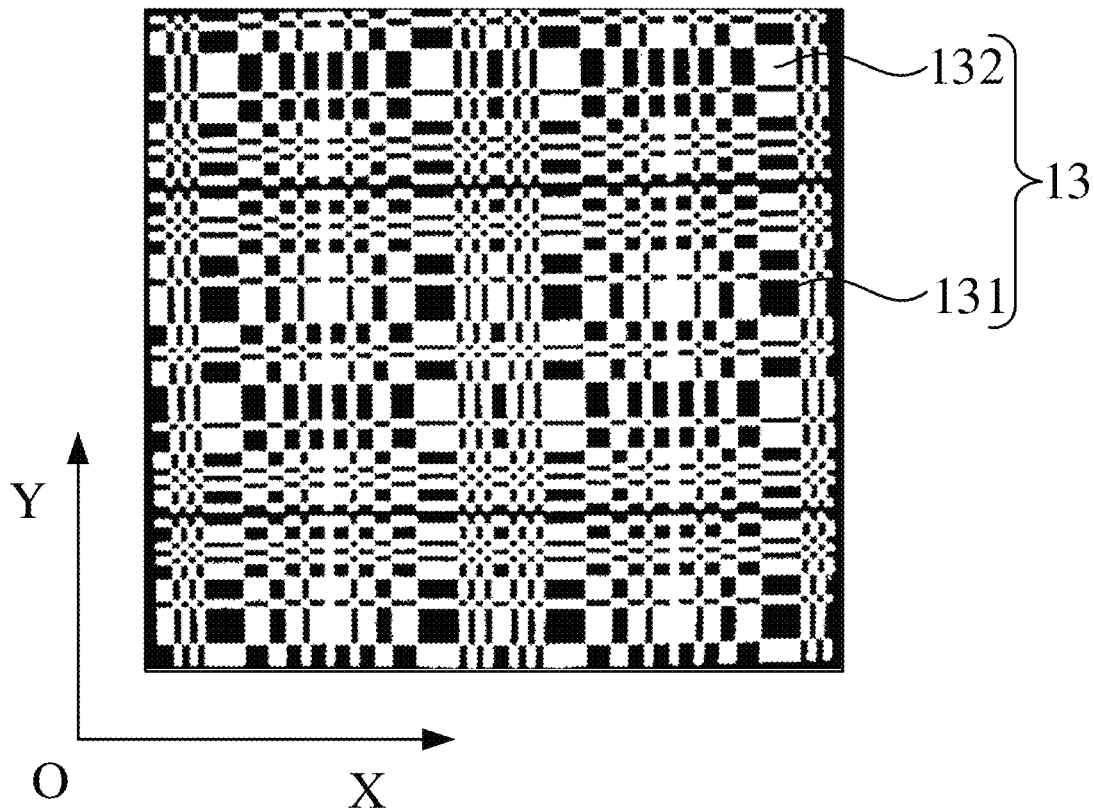
FIG. 6 is a top view showing a structure of a coded aperture mask layer, in accordance with some embodiments of the present disclosure.

Here, the plurality of first light-transmission portions 132 of the coded aperture mask layer 13 are portions of the coded aperture mask layer 13 that allow light to pass therethrough, and the plurality of first light-shielding portions 131 of the coded aperture mask layer 13 are portions of the coded aperture mask layer 13 that do not allow light to pass therethrough. The plurality of first light-transmission portions 132 and the plurality of first light-shielding portions 131 are arranged according to a preset pattern required in forming the coded aperture array. Exemplarily, as shown in FIG. 6, in each of a second direction OX and a third direction OY, the first light-transmission portions 132 and the first light-shielding portions 131 are arranged alternately. Both the second direction OX and the third direction OY are parallel to a plane where the coded aperture mask layer 13 is located, and the second direction OX and the third direction OY are perpendicular to each other.

The coded aperture mask layer 13 is configured to form at least one part of the coded aperture array, which means that the coded aperture mask layer 13 may form the whole coded aperture array, or may form a part of the coded aperture array. The "form a part of the coded aperture array" means that the coded aperture mask layer 13 cooperates with other film layer(s) to form the coded aperture array.

In some examples, the "coded aperture array" includes a plurality of apertures arranged in an array and each having a diameter of 1 μm to 70 μm (of course, other diameter ranges are also possible). The plurality of first light-transmission portions 132 of the coded aperture mask layer 13 form the plurality of apertures included in the coded aperture array, or cooperate with other film layer(s) to form the plurality of apertures included in the coded aperture array.

The pattern presented by the plurality of first light-transmission portions 132 of the coded aperture mask layer 13 may be calculated and designed according to the corresponding image restoration algorithm and the type of the texture to be recognized. The pattern presented by the plurality of first light-transmission portions 132 is not limited here, as long as the coded image (i.e., the intermediate image mentioned hereinafter) can be decoded into a clear texture image by the image restoration algorithm corresponding to the pattern presented by the plurality of first light-transmission portions 132. Exemplarily, the pattern of the coded aperture mask layer 13 is shown in FIG. 6. FIG. 6 shows only one pattern of the coded aperture mask layer 13, and the specific pattern will be subject to actual applications.

Figure 7:
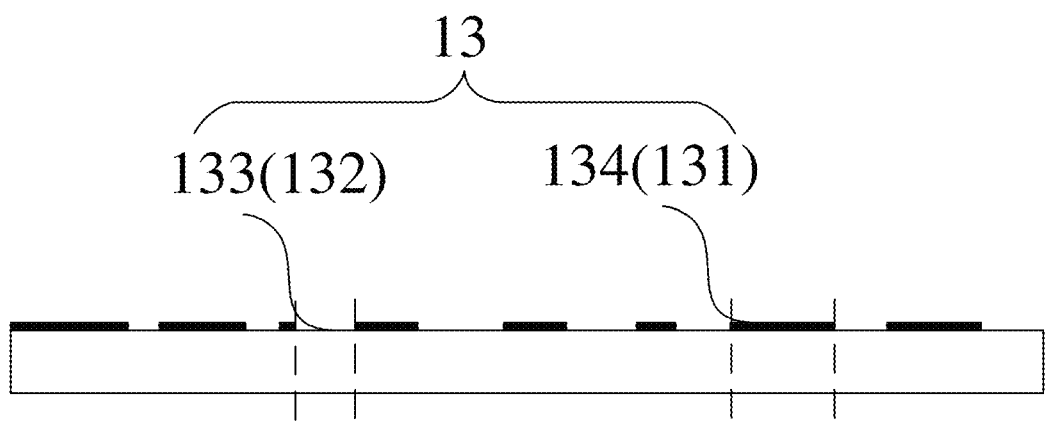
FIG. 7 is a sectional view showing a partial structure of a coded aperture mask layer, in accordance with some embodiments of the present disclosure.

In some embodiments, as shown in FIG. 7, the coded aperture mask layer 13 includes a light-transmission substrate 133 and a plurality of light-shielding coatings 134 disposed on the substrate 133. The plurality of light-shielding coatings 134 are configured to form the plurality of first light-shielding portions 131 of the coded aperture mask layer 13, and portions of the substrate 133 not covered with the plurality of light-shielding coatings are configured to form the plurality of first light-transmission portions 132 of the coded aperture mask layer 13. In this way, in the process of manufacturing the coded aperture mask layer 13, it is just needed to prepare the light-transmission substrate 133 and then apply a plurality of light-shielding coatings 134 onto corresponding regions of the light-transmission substrate 133 as required, which makes the manufacturing process very simple. Exemplarily, the substrate 133 may be made of glass, polyethylene terephthalate (PET) or the like, and the light-shielding coatings 134 may be made of black photoresist, graphite, light-shielding metal or the like.

In some other embodiments, referring to FIG. 3, the plurality of first light-transmission portions 132 included in the coded aperture mask layer 13 are hollow structures. In this way, in the process of manufacturing the coded aperture mask layer 13, it is just needed to form a film layer by selecting an opaque material (e.g., polyimide (PI), PET, glass or the like), and then patterning the film layer through a patterning process (e.g., photolithographic process) to remove the material in regions where the plurality of first light-transmission portions 132 are to be formed, so as to form the plurality of hollow structures. The plurality of hollow structures may be used as the plurality of first light-transmission portions 132, and portions of the coded aperture mask layer 13 other than the plurality of hollow structures may be used as the plurality of first light-shielding portions 131.

Additionally, in a case where the plurality of first light-transmission portions 132 included in the coded aperture mask layer 13 are hollow structures, a transparent planarization protective layer may be formed on a side of the coded aperture mask layer 13 away from the first base 11. During the formation of the planarization protective layer, a material of the planarization protective layer fills the hollow structures of the coded aperture mask layer 13, which may make the surface of the display panel be planarized and the coded aperture mask layer 13 be protected, and may further ensure a uniform stress on the coded aperture mask layer 13, so as to reduce the probability of cracking of the coded aperture mask layer 13.

In some embodiments, the plurality of optical sensors 121 included in the optical sensing layer 12 are arranged in an array (of course, other arrangements may also be possible). Each of the plurality of optical sensors 121 corresponds to one or more sub-pixels of the display panel 10. Here, that "each of the plurality of optical sensors 12 corresponds to one or more sub-pixels of the display panel 10" means that each of the optical sensors 121 is configured to receive light passed through one or more sub-pixels, which may be considered as follows: an orthographic projection of each optical sensor 121 on the first base 11 covers an orthographic projection of one or more sub-pixels on the first base 11. The plurality of optical sensors 121 are configured to convert optical signals into electrical signals after receiving the texture recognition light passed through the coded aperture mask layer 13. The specific structure and type of each optical sensor 121 will not be limited herein. The optical sensors 121 may include photosensitive sensors. For example, the optical sensors 121 may be charge coupled devices (CCDs).

Specific locations of the coded aperture mask layer 13 and the optical sensing layer 12 are not limited herein, as long as the texture recognition light passing through the coded aperture mask layer 13 can reach the optical sensing layer 12.

Exemplarily, a positional relationship between the coded aperture mask layer 13 and the optical sensing layer 12 is shown in FIG. 3. The coded aperture mask layer 13, the optical sensing layer 12 and the first base 11 are arranged in sequence along the first direction BA.

Or, a positional relationship between the coded aperture mask layer 13 and the optical sensing layer 12 is shown in FIG. 4. The coded aperture mask layer 13, the first base 11 and the optical sensing layer 12 are arranged in sequence along the first direction BA.

Or, a positional relationship between the coded aperture mask layer 13 and the optical sensing layer 12 is shown in FIG. 5. The first base 11, the coded aperture mask layer 13 and the optical sensing layer 12 are arranged in sequence along the first direction BA.

In the embodiments of the present disclosure, the light that reaches the optical sensing layer 12 and is converted into electrical signals by the optical sensing layer 12 may be referred to as the texture recognition light. For example, in a case where the texture to be recognized is a fingerprint, the texture recognition light includes light reflected by the fingerprint of the finger. The light reflected by the fingerprint includes light reflected by ridges of the fingerprint and light reflected by valleys of the fingerprint. Additionally, in a case where the ambient light reaches the optical sensing layer 12 after passing through the coded aperture array and then is converted into electrical signals by the optical sensing layer 12, the texture recognition light further includes the ambient light reaching the optical sensing layer 12.

In the texture recognition light, the light reflected onto the optical sensing layer 12 by the texture to be recognized is light required for the fingerprint recognition, so this part of light may be called valid light; and, the light not reflected by the texture to be recognized such as the ambient light reaching the optical sensing layer 12 after passing through the coded aperture array is light not required for the fingerprint recognition, so this part of light may be called invalid light.

On the basis of the coded aperture array formed by the coded aperture mask layer 13, when the texture recognition light passes through the plurality of first light-transmission portions 132 included in the coded aperture mask layer 13, the plurality of first light-shielding portions 131 included in the coded aperture mask layer 13 filter a part of the light that does not carry the information about the texture to be recognized. In this way, the proportion of the valid light in the texture recognition light received by the plurality of optical sensors 121 in the optical sensing layer 12 increases, while the proportion of the invalid light decreases. In addition, the texture recognition light is coded light. As a result, a coded image (also referred to as an intermediate image) of the texture to be recognized may be obtained according to the electrical signals converted by the optical sensors 121 from the received texture recognition light which has been coded. Then the coded image can be decoded into a clear and accurate texture image by the corresponding image restoration algorithm.

In the above embodiments, the coded aperture mask layer 13 needs to be provided in the display panel 10, and combined with the coded aperture imaging technology, the display panel 10 may realize the texture recognition function. The obtained texture image is clear and accurate. Accordingly, there is no requirement for the display panel 10 to have a high PPI, which reduces the design and process difficulties of the display panel 10.

In some embodiments, as shown in FIG. 6, the coded aperture mask layer 13 is configured to form the coded aperture array, that is, the coded aperture array is composed of only the coded aperture mask layer 13. In this way, the whole coded aperture array is composed of only the coded aperture mask layer 13, and thus the thickness of the display panel 10 is reduced, which is advantageous for the display panel 10 to be thin and light.

Figure 8A:
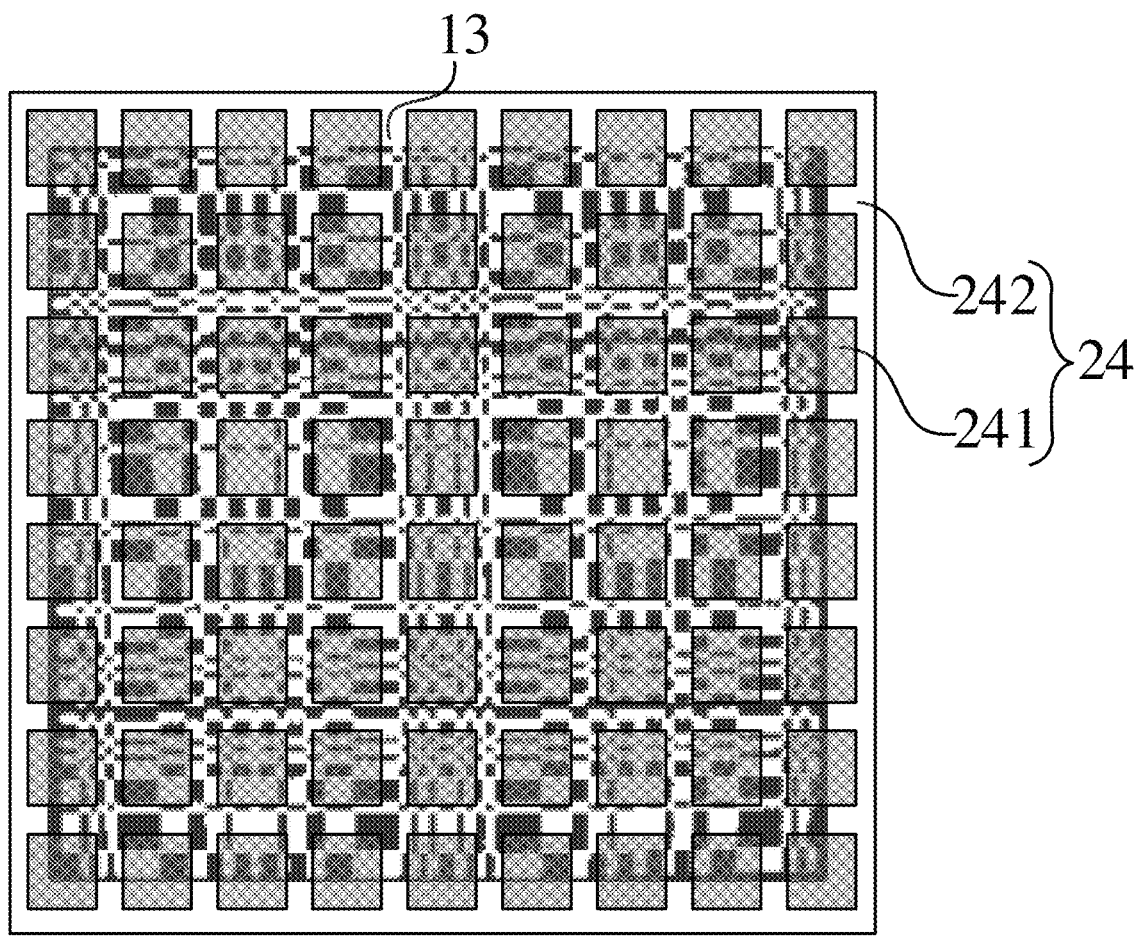
FIG. 8A is a top view showing a structure in which a coded aperture mask layer and a coded aperture fit layer overlap, in accordance with some embodiments of the present disclosure.
Figure 8B:
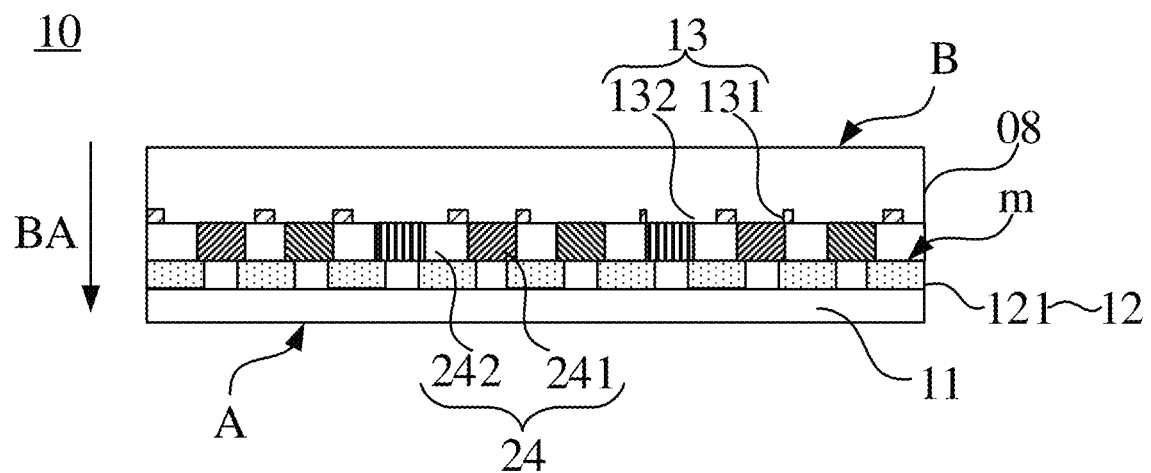
FIG. 8B is a sectional view showing a partial structure of yet another display panel, in accordance with some embodiments of the present disclosure.

In some other embodiments, as shown in FIGS. 8A and 8B, the display panel 10 further includes a coded aperture fit layer 24 disposed on a side of the optical sensing layer 12 proximate to the light-exit side B. The coded aperture fit layer 24 includes a second light-transmission portion 242 and a second light-shielding portion 241. Orthographic projections of the plurality of first light-shielding portions 131 on a photosensitive surface m of the optical sensing layer 12 at least partially overlap an orthographic projection of the second light-transmission portion 242 on the photosensitive surface m of the optical sensing layer 12, so that the coded aperture mask layer 13 cooperates with the coded aperture fit layer 24 to form the coded aperture array.

In this way, the coded aperture array is formed by overlapping the coded aperture mask layer 13 with the coded aperture fit layer 24, which reduces the precision requirements and the process difficulty during the manufacturing process of the coded aperture mask layer 13.

In some embodiments, as shown in FIG. 8B, the coded aperture mask layer 13 and the coded aperture fit layer 24 are located on a side of the optical sensing layer 12 proximate to the light-exit side B. As a result, the light reflected by the texture to be recognized may reach the optical sensing layer 12 after passing through the coded aperture mask layer 13 and the coded aperture fit layer 24. It is to be noted that the relative position of the coded aperture mask layer 13 and the coded aperture fit layer 24 will not be limited. The coded aperture fit layer 24 may be located between the coded aperture mask layer 13 and the optical sensing layer 12 (this situation is shown in FIG. 8B). The coded aperture mask layer 13 may also be located between the coded aperture fit layer 24 and the optical sensing layer 12.

The display panel 10 may be an active light-emitting display panel or a passive light-emitting display panel. The active light-emitting display panel may be an organic light-emitting diode (OLED) display panel, a quantum dot light-emitting diode (abbreviated as QLED) display panel, a micro light-emitting diode (micro LED) display panel, a mini light-emitting diode (mini LED) display panel or the like. The passive light-emitting display panel may be a liquid crystal display (LCD), an electrophoretic display (abbreviated as EPD) or the like.

In some embodiments, as shown in FIGS. 9 to 12, in a case where the display panel 10 is an active light-emitting display panel, the active light-emitting display panel includes a first base 11 and a first pixel layer 14 disposed above the first base 11. The first pixel layer 14 includes a plurality of light-emitting portions 141 and a light-transmission pixel defining layer 142 configured to isolate two adjacent light-emitting portions 141.

The coded aperture fit layer 24 includes at least one part of the first pixel layer 14. The plurality of light-emitting portions 141 of the first pixel layer 14 are configured to form the second light-shielding portion 241 of the coded aperture fit layer 24, and the pixel defining layer 142 of the first pixel layer 14 is configured to form the second light-transmission portion 242 of the coded aperture fit layer 24. A side of the first pixel layer 14 away from the first base 11 is the light-exit side B of the active light-emitting display panel, and the optical sensing layer 12 is disposed on a side of the first pixel layer 14 away from the light-exit side to avoid blocking the light emitted by the plurality of light-emitting portions 141 of the first pixel layer 14.

Exemplarily, the display panel 10 further includes a driver circuit layer disposed between the first base 11 and the first pixel layer 14. The driver circuit layer includes a plurality of pixel driver circuits for driving the plurality of light-emitting portions 141 to emit light. The first pixel layer 14 includes a second electrode layer, an organic functional layer and a first electrode layer which are stacked in sequence along the first direction BA. The first electrode layer is an anode layer, and the anode layer includes a plurality of anodes, each of which is coupled to a corresponding driver circuit in the driver circuit layer. The second electrode layer is a cathode layer.

Additionally, the pixel defining layer 142 includes a plurality of openings, the organic functional layer includes the plurality of light-emitting portions 141, and the light-emitting portions 141 are located in the plurality of openings of the pixel defining layer 142, respectively. The organic functional layer may further include one or more of a hole transport layer, a hole injection layer, an electron transport layer, an electron injection layer and the like, which is not limited in the embodiments of the present disclosure.

Continuously referring to FIGS. 9 to 12, in a case where the side B is the light-exit side of the display panel 10, the first electrode layer of the first pixel layer 14 is made of a light-shielding conductive material. In this way, the first electrode layer may reflect the light emitted by the plurality of light-emitting portions 141 to the light-exit side B, and the regions where the plurality of light-emitting portions 141 in the first pixel layer 14 are located do not allow light to pass through, so that the plurality of light-emitting portions 141 in the first pixel layer 14 may be used as the second light-shielding portion 241 of the coded aperture fit layer 24. Exemplarily, the material of the first electrode layer may include metal with high reflectivity. For example, the material of the first electrode layer may include at least one of silver, copper, aluminum or the like.

In the active light-emitting display panel, the plurality of light-emitting portions 141 are used to form the second light-shielding portion 241 of the coded aperture fit layer 24, and the pixel defining layer 142 is used to form the second light-transmission portion 242 of the coded aperture fit layer 24. In this way, the coded aperture fit layer 24 is realized by existing structures of the active light-emitting display panel, and the thickness of the display panel 10 will not be increased, which makes it advantageous for the display panel 10 to be thin and light.

Figure 9:
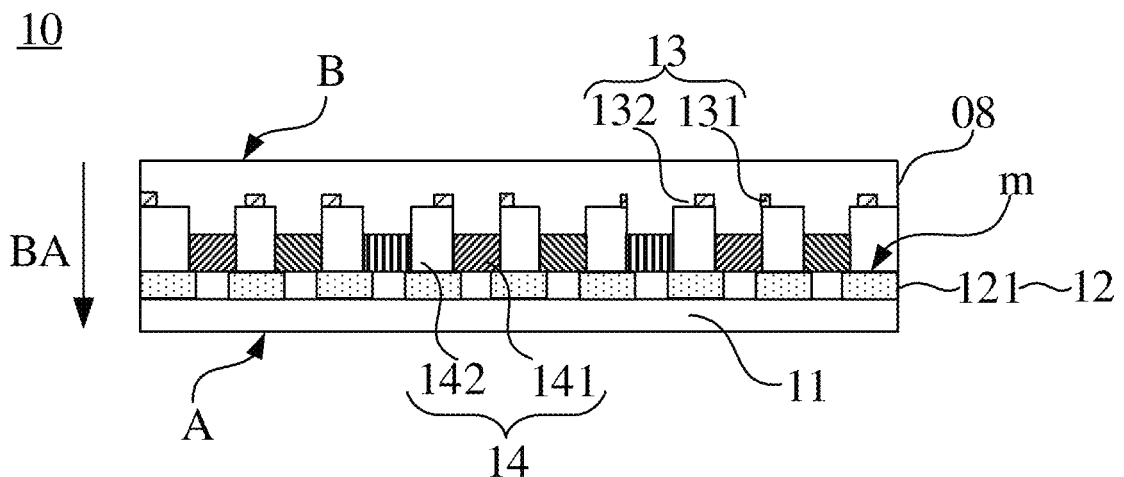
FIG. 9 is a sectional view showing a partial structure of yet another display panel, in accordance with some embodiments of the present disclosure.
Figure 11:
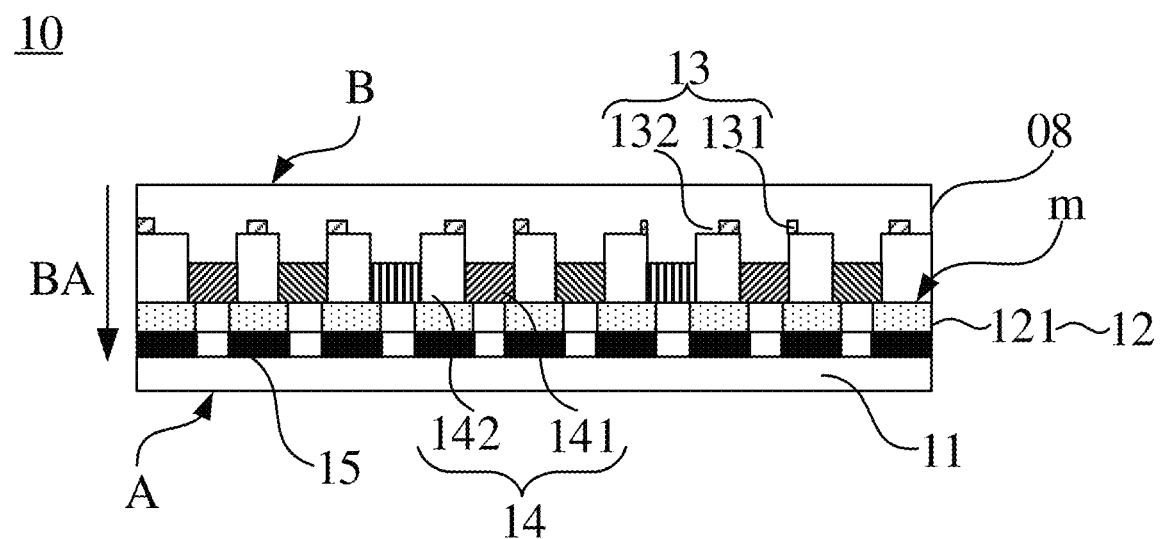
FIG. 11 is a sectional view showing a partial structure of yet another display panel, in accordance with some embodiments of the present disclosure.

Exemplarily, as shown in FIGS. 9 and 11, the coded aperture mask layer 13 is located on a side of the first pixel layer 14 proximate to the light-exit side B. Orthographic projections of the plurality of first light-shielding portions 131 of the coded aperture mask layer 13 on the photosensitive surface m are within an orthographic projection of the pixel defining layer 142 on the photosensitive surface m. Orthographic projections of a part of the plurality of first light-transmission portions 132 of the coded aperture mask layer 13 on the photosensitive surface m are within the orthographic projection of the pixel defining layer 142 on the photosensitive surface m, and orthographic projections of another part of the first light-transmission portions 132 on the photosensitive surface m are within orthographic projections of the plurality of light-emitting portions 141 of the first pixel layer 14 on the photosensitive surface m.

In this way, the light emitted by the plurality of light-emitting portions 141 can exit from a part of the first light-transmission portions 132, and the emitted light is reflected by the texture to be recognized (e.g., fingerprint) to form at least one part of the texture recognition light. Since the orthographic projections of a part of the first light-transmission portions 132 on the photosensitive surface m are within the orthographic projection of the transparent pixel defining layer 142 on the photosensitive surface m, the texture recognition light can pass through the overlapping regions of the plurality of first light-transmission portions 132 and the transparent pixel defining layer 142 and reach the corresponding optical sensors 121. Accordingly, it is convenient for each optical sensor 121 of the optical sensing layer 12 to convert the texture recognition light which reaches its photosensitive surface m into electrical signals.

Figure 10:
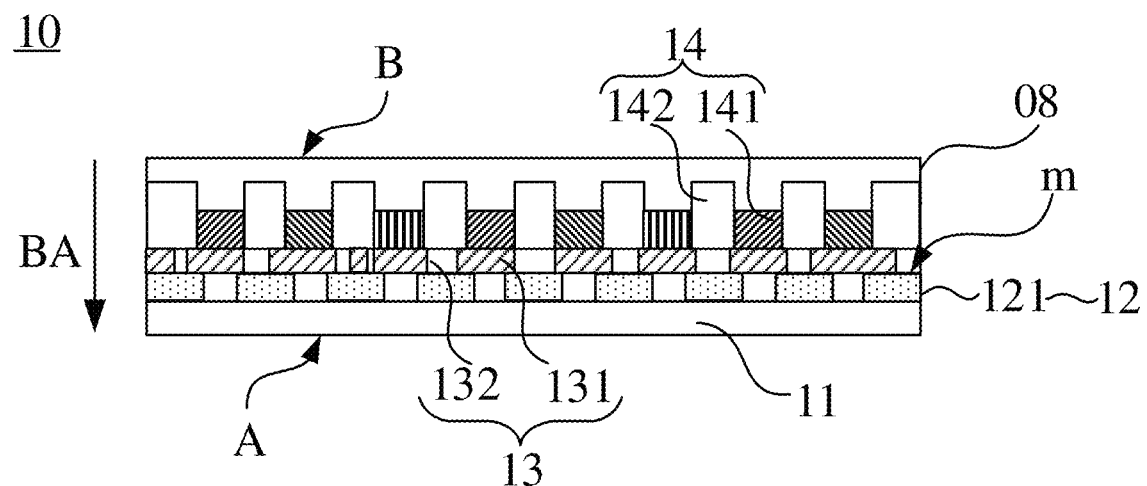
FIG. 10 is a sectional view showing a partial structure of yet another display pane, in accordance with some embodiments of the present disclosure.
Figure 12:
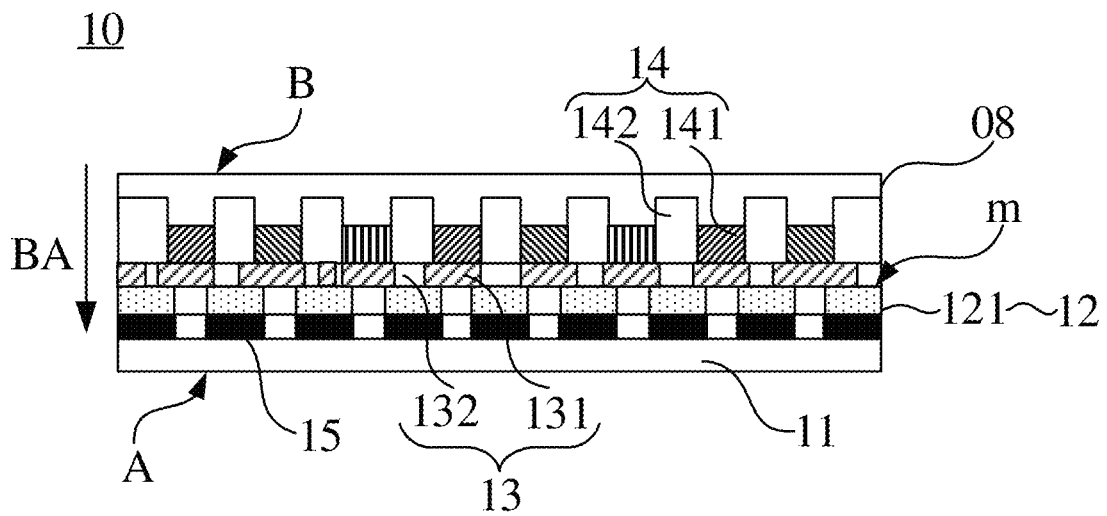
FIG. 12 is a sectional view showing a partial structure yet another display panel, in accordance with some embodiments of the present disclosure.

In some other embodiments, as shown in FIGS. 10 and 12, the coded aperture mask layer 13 is located between the first pixel layer 14 and the optical sensing layer 12. The orthographic projections of the plurality of light-emitting portions 141 of the first pixel layer 14 on the photosensitive surface m overlap a part of the orthographic projections of the plurality of first light-shielding portions 131 of the coded aperture mask layer 13 on the photosensitive surface m. Or, the orthographic projections of the plurality of light-emitting portions 141 of the first pixel layer 14 on the photosensitive surface m overlap a part of the orthographic projections of the plurality of first light-transmission portions 132 of the coded aperture mask layer 13 on the photosensitive surface m. Or, the orthographic projections of the plurality of light-emitting portions 141 of the first pixel layer 14 on the photosensitive surface m overlap a part of the orthographic projections of the plurality of first light-shielding portions 131 and a part of the orthographic projections of the plurality of first light-transmission portions 132 of the coded aperture mask layer 13 on the photosensitive surface m.

In this way, the light emitted by the plurality of light-emitting portions 141 is reflected by the texture to be recognized (e.g., fingerprint) to form at least one part of the texture recognition light, and the texture recognition light can pass through the non-overlapping regions of the transparent pixel defining layer 142 and the plurality of first light-shielding portions 131 and reach corresponding optical sensors 121. Accordingly, it is convenient for each optical sensor 121 of the optical sensing layer 12 to convert the texture recognition light which reaches its photosensitive surface m into electrical signals.

In some embodiments, the optical sensing layer 12 is disposed between the first pixel layer 14 and the first base 11 (this situation is shown in FIGS. 9 to 12). In some other embodiments, the optical sensing layer 12 may be disposed on a side of the first base 11 away from the first pixel layer 14. It can be understood that, in a case where the optical sensing layer 12 is disposed on the side of the first base 11 away from the first pixel layer 14, the material of the first base 11 needs to be a transparent material, such as glass or PET, in order to avoid obstructing the texture recognition light from reaching the optical sensing layer 12.

To decrease an amount of the invalid light that reaches the optical sensing layer 12 and does not carry information about the texture to be recognized, in some embodiments, as shown in FIGS. 11 and 12, the display panel 10 further includes a light blocking layer 15 disposed on a side of the optical sensing layer 12 away from the first pixel layer 14. The light blocking layer 15 is configured to block light which enters the display panel 10 from the non-light-exit side A of the display panel 10. In this way, due to the blocking effect of the light blocking layer 15, the amount of the invalid light which reaches the optical sensing layer 12 from the non-light-exit side A of the display panel 10 is decreased, and the proportion of the valid light which carries the information about the texture to be recognized in the texture recognition light sensed by the optical sensing layer 12 is increased. Accordingly, the electrical signals converted by the optical sensing layer 12 can reflect the texture to be recognized more accurately.

Exemplarily, orthographic projections of the plurality of optical sensors 121 of the optical sensing layer 12 on the first base 11 are within an orthographic projection of the light blocking layer 15 on the first base 11. In this way, the blocking effect of the light blocking light 15 on the light which enters the display panel 10 from the non-light-exit side A of the display panel 10 may be further improved, and thus the amount of the invalid light in the texture recognition light may be further decreased.

In some embodiments, as shown in FIGS. 3 to 5 and FIGS. 9 to 12, the active light-emitting display panel further includes an encapsulation layer 08. The encapsulation layer 08 is used to protect the plurality of optical sensors 121, the coded aperture mask layer 13 and the first pixel layer 14 in the display panel, so as to prevent external water, oxygen, dust and the like from entering the display panel and causing corrosive damages to these structures.

In some embodiments, to improve the light exit efficiency of the display panel, the encapsulation layer 08 is made of a material with high light transmittance. For example, the encapsulation layer 08 is a cover sheet which may be made of glass, PET or the like. For another example, the encapsulation layer 08 is an encapsulation film structure composed of a plurality of film layers stacked. The encapsulation film structure may be composed of inorganic films and organic films alternately stacked, and the film closest to the first base and the film farthest from the first base are both inorganic films.

Figure 13:
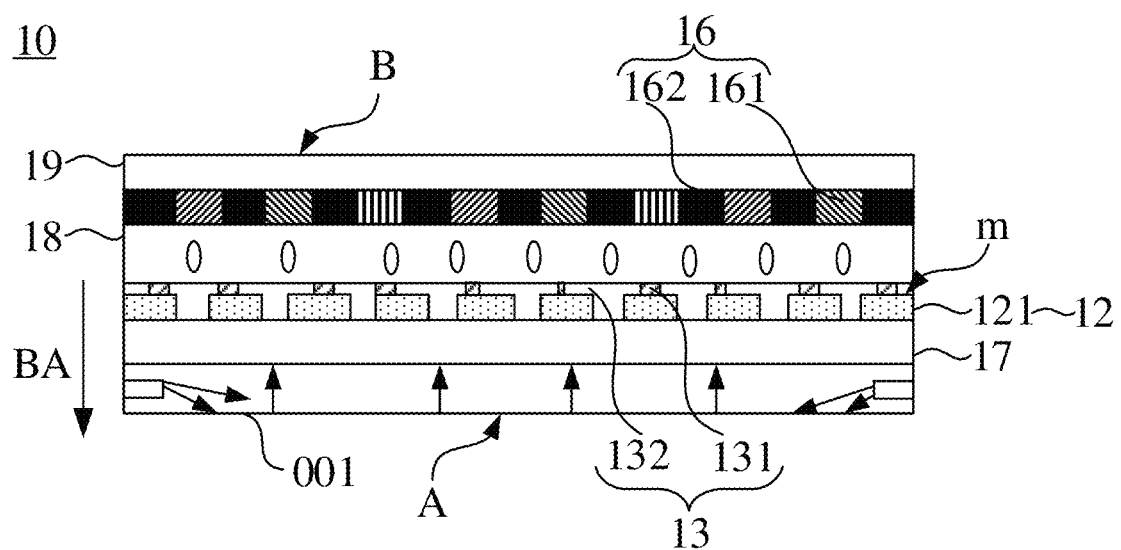
FIG. 13 is a sectional view showing a partial structure yet another display panel, in accordance with some embodiments of the present disclosure.

In some embodiments, as shown in FIG. 13, the display panel 10 may be a passive light-emitting display panel, for example, an LCD display panel, an electrophoretic display panel or the like. The following description will be given by taking an example in which the display panel 10 is the LCD display panel. The passive light-emitting display panel includes a second base 17, a third base 19, a liquid crystal layer 18, a plurality of filter portions 161, and a light-shielding pattern 162 configured to isolate two adjacent filter portions 161. The second base 17 and the third base 19 are opposite to each other. The liquid crystal layer 18 is disposed between the second base 17 and the third base 19. The plurality of filter portions 161 are disposed on a surface of the second base 17 or the third base 19 proximate to the liquid crystal layer 18. FIG. 13 shows a case in which the plurality of filter portions 161 are disposed on a surface of the third base 19 proximate to the liquid crystal layer 18. For example, the light-shielding pattern 162 may be a black matrix (BM).

Here, the plurality of filter portions are configured to form the second light-transmission portion 242 of the coded aperture fit layer 24, and the light-shielding pattern 162 is configured to form the second light-shielding portion 241 of the coded aperture fit layer 24. The third base 19 is closer to the light-exit side B of the display panel 10 relative to the second base 17. The optical sensing layer 12 is disposed on a side of the second base 17 proximate to or away from the liquid crystal layer 18. FIG. 13 shows a case in which the optical sensing layer 12 is disposed on a side of the second base 17 proximate to the liquid crystal layer 18.

It is to be noted that the display panel 10 further includes a backlight module 001 which is configured to provide the display panel 10 with light required for image display. During the fingerprint recognition of the display panel 10, the light emitted from the backlight module 01 sequentially passes through the second base 17, a gap between two adjacent optical sensors 121, the liquid crystal layer 18, the plurality of filter portions 161 and the third base 19, falls onto the texture to be recognized (e.g., a fingerprint), and is reflected by the texture to be recognized. The reflected light passes through the third base 19, the plurality of filter portions 161 and the liquid crystal layer 05 once again, then reaches the optical sensors 121 in the optical sensing layer 12, and is received and converted into electrical signals by the optical sensors 121.

In the passive light-emitting display panel, the light-shielding pattern 162 is used as the second light-shielding portion 241 of the coded aperture fit layer 24, and the plurality of filter portions 161 are used as the second light-transmission portion 242 of the coded aperture fit layer 24. In this way, there is no need to provide an additional coded aperture fit layer 24 due to existing structures in the passive light-emitting display panel which realizes the function of the coded aperture fit layer 24. Accordingly, the space occupied by the coded aperture fit layer 24 is saved, and the thickness of the display panel 10 will not be increased, which makes it advantageous for the thinning of the display panel 10.

Figure 14:
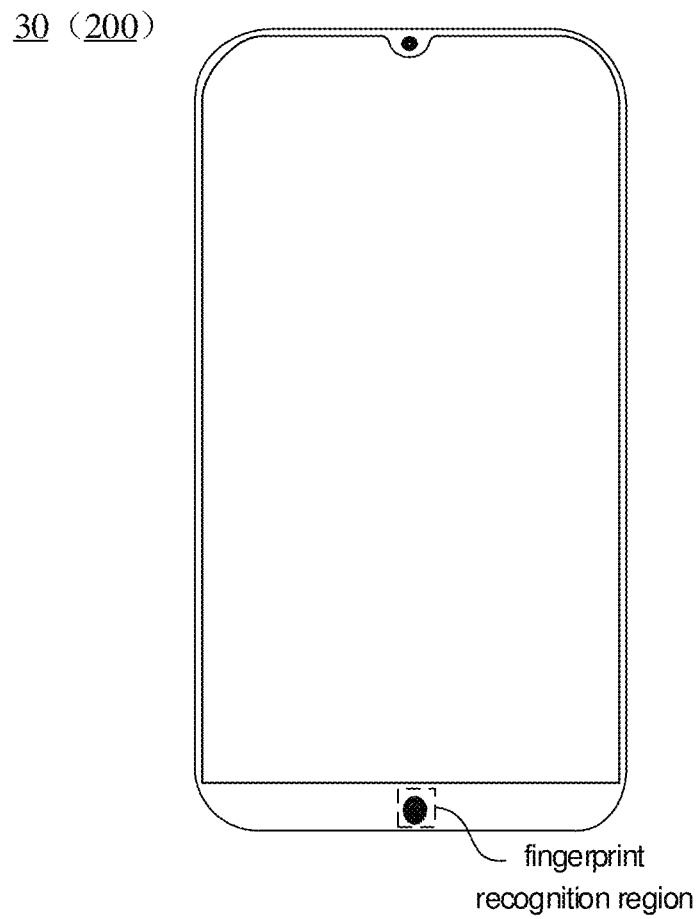
FIG. 14 is a schematic structure diagram of a display apparatus, in accordance with some embodiments of the present disclosure.

In some embodiments of the present disclosure, as shown in FIG. 14, a display apparatus 30 is provided. The display apparatus 30 includes the display panel 10 according to any one of the above embodiments. That is, the display panel 10 is a display panel with a texture recognition function. For example, the display panel 10 is a display panel with a fingerprint recognition function.

In addition to the display panel 10, the display apparatus 30 may further include a driver circuit board coupled to the display panel 10. The driver circuit board is configured to drive and control the display panel 10 to realize functions such as display, touch or fingerprint recognition.

The display apparatus 30 provided in the embodiments of the present disclosure has the same beneficial effects as the display panel provided in the above embodiments, and details will not be repeated here.

The display apparatus 30 provided in the embodiments of the present disclosure may be any device that displays moving images (e.g., video) or stationary images (e.g., static images) and text or pictures. More specifically, it is contemplated that the embodiments may be implemented in or associated with various electronic devices. The various electronic devices include, but not limited to, mobile phones, wireless devices, portable android devices (PADs), handheld or portable computers, global positioning system (GPS) receivers/navigators, cameras, MPEG-4 Part 14 (MP4) video players, video cameras, game consoles, watches, clocks, calculators, TV monitors, flat panel displays, computer monitors, vehicle displays (e.g., odometer displays, etc.), navigators, cabin controllers and/or displays, camera view displays (e.g., displays for rear cameras in vehicles), electronic photos, electronic billboards or indicators, projectors, building structures, packaging and aesthetic structures (e.g., displays for displaying images of a piece of jewelry), etc.

Figure 15:
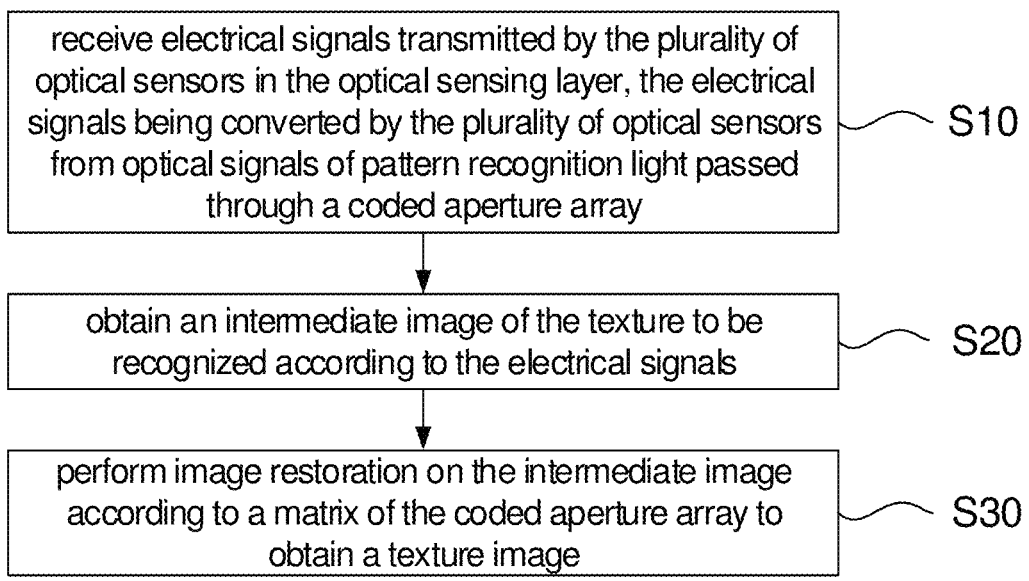
FIG. 15 is a flow chart of a texture recognition method, in accordance with some embodiments of the present disclosure.

Some embodiments of the present disclosure further provide a texture recognition method, which is applied to the display panel 10 according any one of the above embodiments. As shown in FIG. 15, the texture recognition method includes S10 to S30.

In S10, electrical signals transmitted by the plurality of optical sensors 121 in the optical sensing layer 12 are received. The electrical signals are converted by the plurality of optical sensors from optical signals of the texture recognition light passed through the coded aperture array.

In S20, an intermediate image of the texture to be recognized is obtained according to the electrical signals.

In S30, image restoration is performed on the intermediate image according to a matrix of the coded aperture array to obtain a texture image.

Here, the matrix of the coded aperture array may be represented as a digital signal. That "image restoration is performed on the intermediate image according to the matrix of the coded aperture array" means that the intermediate image is decoded according to the matrix of the coded aperture array which is represented as a digital signal, thereby obtaining the clear texture image.

In some examples, in a case where the coded aperture array is composed of the coded aperture mask layer 13, regions corresponding to the first light-transmission portions 132 of the coded aperture mask layer 13 are regarded as "1", and regions corresponding to the first light-shielding portions 131 of the coded aperture mask layer 13 are regarded as "0", in order to obtain the matrix of the coded aperture array which is represented as a digital signal. In a case where the coded aperture mask layer 13 cooperates with the coded aperture fit layer 24 to form the coded aperture array, in a pattern formed by stacking the coded aperture mask layer 13 and the coded aperture fit layer 24, light-transmission regions are regarded as "1", and opaque regions are regarded as "0", in order to obtain the matrix of the coded aperture array which is represented as a digital signal.

It is also possible to obtain the matrix of the coded aperture array which is represented as a digital signal by regarding the regions corresponding to the first light-transmission portions 132 or the light-transmission regions as "0", and the regions corresponding to the first light-shielding portions 131 or the opaque regions as "1", which are not limited in the embodiments of the present disclosure.

In the texture recognition method of the display panel 10 provided in the embodiments of the present disclosure, after the electrical signals transmitted by the optical sensing layer 12 are received, the intermediate image of the texture to be recognized is obtained according to the electrical signals. The intermediate image, which is a coded image coded by the coded aperture array, is decoded by means of the matrix of the coded aperture array, so that the clear and accurate texture image can be obtained.

Figure 18A:
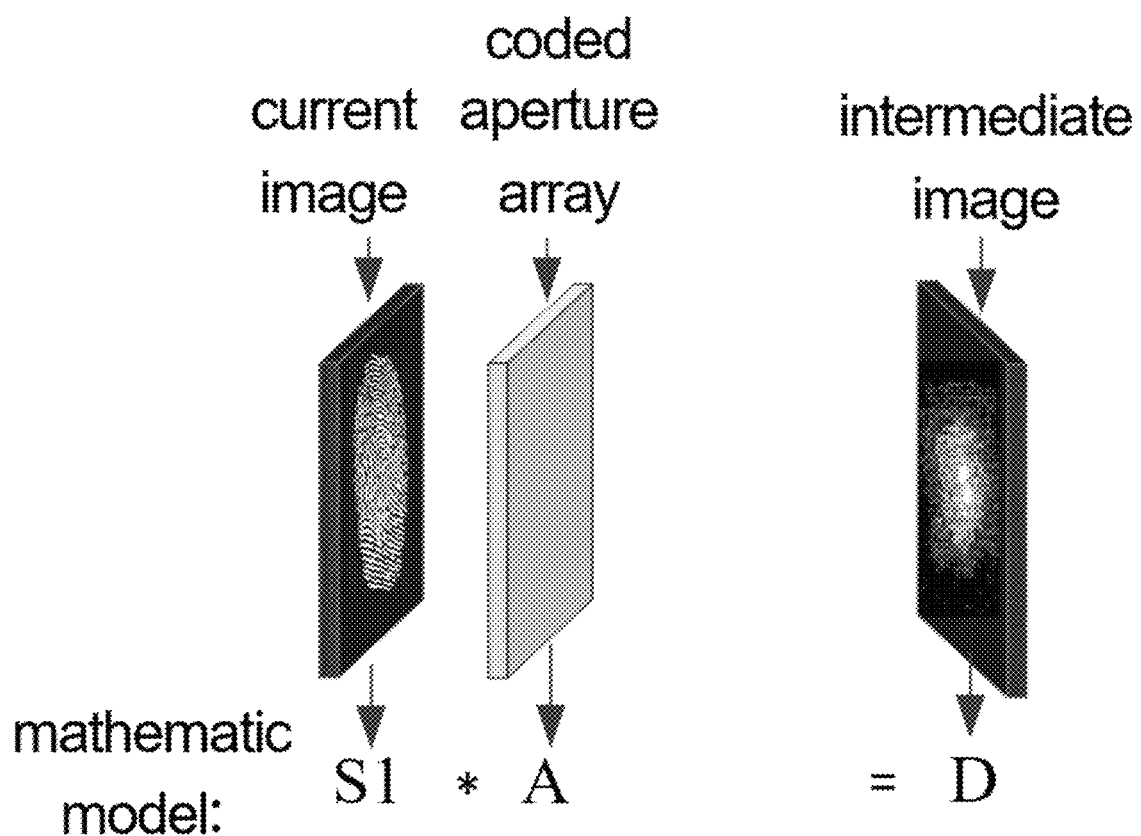
FIG. 18A is a diagram showing a mathematic model, in accordance with some embodiments of the present disclosure.
Figure 16:
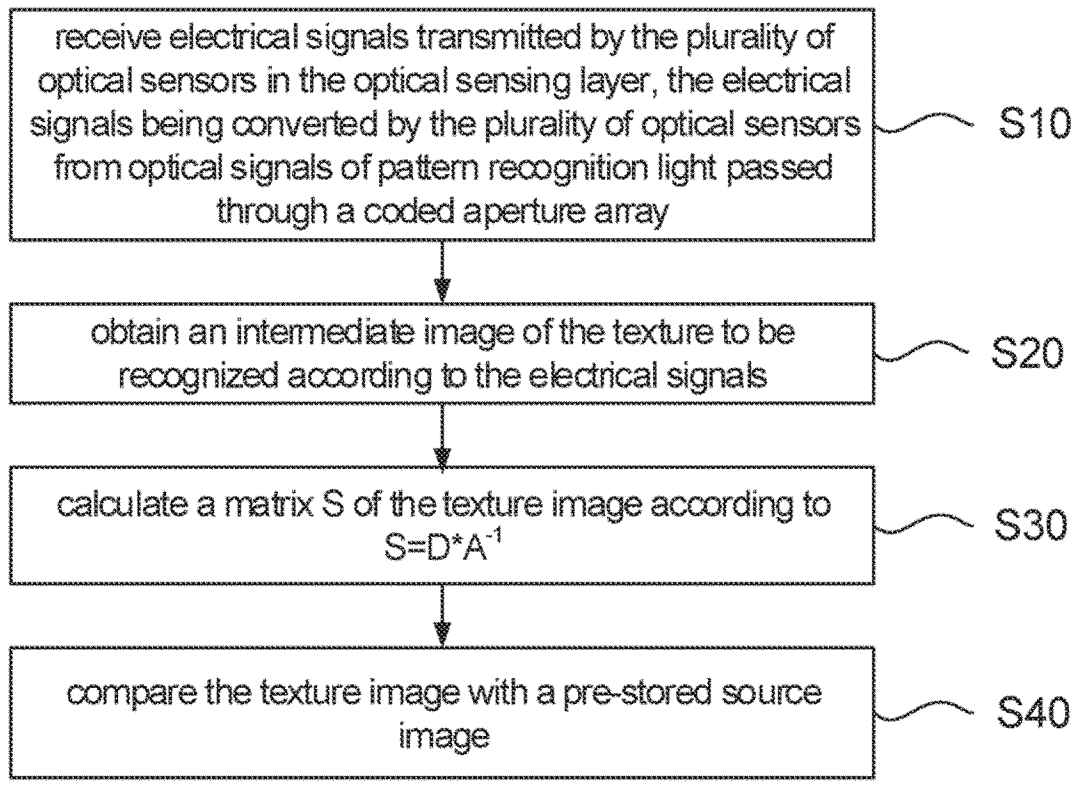
FIG. 16 is a flow chart of another texture recognition method, in accordance with some embodiments of the present disclosure.

In some embodiments, as shown in FIG. 16, that image restoration is performed on the intermediate image according to the matrix of the coded aperture array to obtain the texture image, includes: calculating a matrix S of the texture image according to $S=D*A^{-1}$. As shown in FIG. 18A, D represents a matrix of the intermediate image, A represents the matrix of the coded aperture array, $A^{-1}$ represents an inverse matrix of A, and $D*A^{-1}$ represents a convolution of D and $A^{-1}$.

Exemplarily, as shown in FIG. 18A, a current image is a texture of a particular part (e.g., a finger) of a user. S1 represents the matrix of the current image which is represented as a digital signal. The light reflected by the texture of the particular part (e.g., fingerprint) of the user passes through the coded aperture array and reaches the optical sensing layer 12. The optical sensing layer 12 converts optical signals into electrical signals. The electrical signals correspond to a fuzzy intermediate image. In this process, it is equivalent to coding the light with the coded aperture array, and the obtained intermediate image is a coded image. In this process, the corresponding mathematic formula is $S1*A=D$, where $S1*A$ represents the convolution of S1 and A.

After the electrical signals are received, D and the inverse matrix $A^{-1}$ of A are convolved by using an image restoration algorithm, and a clear and accurate texture image is obtained. This process is equivalent to decoding the intermediate image, and the corresponding mathematic formula is $S=D*A^{-1}=S1*A*A^{-1}=S1$. That is, $S=D*A^{-1}$.

Figure 18B:
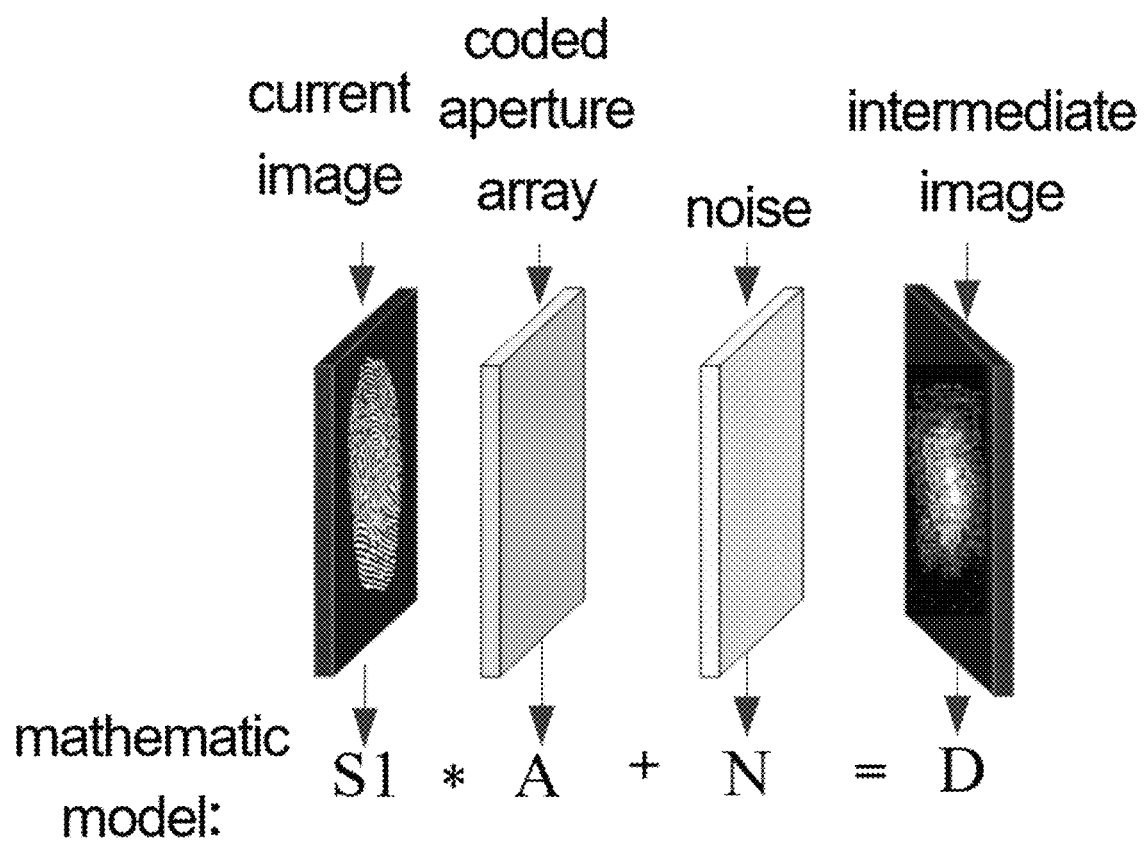
FIG. 18B is a diagram showing another mathematic model, in accordance with some embodiments of the present disclosure.

In some cases, as shown in FIG. 18B, during the process in which the texture recognition light reflected by the texture to be recognized reaches the optical sensing layer 12 after passing through the coded aperture array, it is inevitable that the invalid light such as the ambient light may reach the optical sensing layer 12 after passing through the coded aperture array. Here, the invalid light such as the ambient light incident onto the optical sensing layer 12 may be regarded as noise. Although the noise may influence the accuracy of texture recognition to a certain extent, due to the filtering effect of the coded aperture array described in the embodiments of the present disclosure, less invalid light such as the ambient light can reach the optical sensing layer 12. Therefore, the noise caused by the invalid light such as the ambient light may be ignored.

If N is used to represent a matrix characterizing the noise of the digital signal, then the process of converting the received optical signals corresponding to the texture recognition light into electrical signals to obtain the intermediate image may be regarded as $D=S1*A+N$, and the process of restoring the intermediate image to obtain the clear and accurate texture image may be regarded as $S=D*A^{-1}=S1*A*A^{-1}+N*A^{-1}=S1+N*A^{-1}$. Since the noise is low and negligible, $S=S=D*A^{-1}$ may be obtained.

In some embodiments, as shown in FIG. 16, the texture recognition method further includes the following step.

In S40, the texture image is compared with a pre-stored source image.

For example, the source image may be an image of a texture such as a user's fingerprint or palm print and is pre-stored in an electronic device. For example, the source image may be stored in a memory of the electronic device.

It can be determined whether the recognized texture image is the same as the source image by comparing the recognized texture image with the stored source image. Accordingly, it is determined whether the operator operating the electronic device is the user. As a result, according to the result of determination, the electronic device may act correspondingly. For example, in a case where the electronic device is a mobile phone, if the recognized texture image is determined to be the same as the stored source image, the mobile phone will be unlocked. Or, if the recognized texture image is determined to be the same as the stored source image, an e-payment will be made. The texture recognition method provided in the embodiments of the present disclosure is also applicable to other application scenarios such as fingerprint attendance or fingerprint access control, which will not be listed one by one here.

Figure 17:
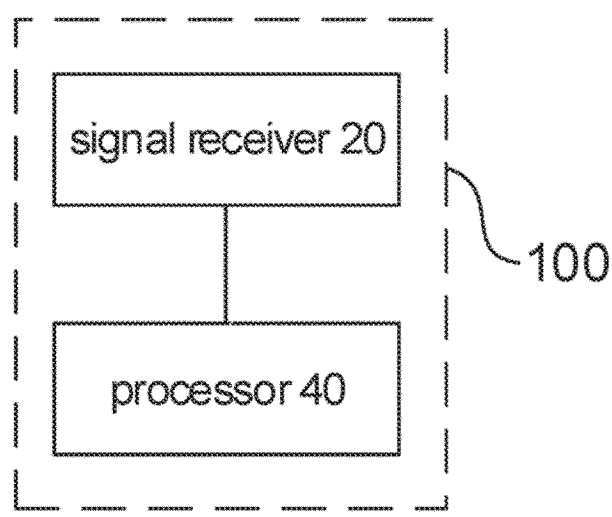
FIG. 17 is a structure diagram of a texture recognition device, in accordance with some embodiments of the present disclosure.

As shown in FIG. 17, some embodiments of the present disclosure provide a texture recognition device 100. The texture recognition device 100 includes a signal receiver 20 and a processor 40. The signal receiver 20 is configured to receive electrical signals transmitted by the plurality of optical sensors 121 in the optical sensing layer 12. The electrical signals are converted by the plurality of optical sensors 121 from optical signals of the texture recognition light passed through the coded aperture array. The processor 40 is configured to obtain an intermediate image of a texture to be recognized according to the electrical signals and then perform image restoration on the intermediate image according to a matrix of the coded aperture array to obtain a texture image.

The signal receiver 20 may be a signal interface disposed in the texture recognition device 100, and the signal interface may be coupled to the optical sensors 121 of the optical sensing layer 12 via signal lines, or may be coupled to the optical sensors 121 in a wireless communication manner. Here, the wireless communication may use any communication standard or protocol, including but not limited to, global system of mobile communication (GSM), general packet radio service (GPRS), code division multiple access (abbreviated as CDMA), wideband code division multiple access (WCDMA), long term evolution (LTE), e-mail, short messaging service (SMS) or the like.

The processor 40 may be a central processing unit (abbreviated as CPU), or may be other general-purpose processors, digital signal processors (abbreviated as DSPs), application specific integrated circuits (abbreviated as ASICs), field programmable gate arrays (abbreviated as FPGAs) or other programmable logic devices, discrete gate or transistor logic devices, discrete hardware components or the like. The general-purpose processors may be microprocessors, or any conventional processor or the like.

The texture recognition device 100 may further include a memory which may be stand-alone and connected to the processor 40 through a communication bus. The memory may also be integrated with the processor 40. The memory is used to store program codes and required data of the texture recognition method provided in the embodiments of the present disclosure. The processor may perform the texture recognition method by running or executing software programs stored in the memory and calling the data stored in the memory.

The memory may be a read-only memory (ROM) or other types of static storage devices capable of storing static information and instructions, a random access memory (RAM) or other types of dynamic storage devices capable of storing information and instructions. The memory may also be an electrically erasable programmable read-only memory (EEPROM), a compact disc read-only memory (CD-ROM) or other optical disk storages, optical disc storages (including compact disc, laser disc, optical disc, digital versatile optical disc, Blu-ray disc, etc.), magnetic disk storage media or other magnetic storage devices, or any other media that can be used to carry or store desired program codes in form of instructions or data structures and can be accessed by a computer.

In this way, after the plurality of optical sensors 121 in the display panel 10 covert the received coded texture recognition light into electrical signals, in the texture recognition device 100, the signal receiver 20 configured to receive the electrical signals transmits the electrical signals to the processor 40. The processor 40 restores an intermediate image corresponding to the electrical signals according to the matrix of the coded aperture array and an image restoration algorithm, so that a clear and accurate texture image may be obtained.

Some embodiments of the present disclosure provide a computer-readable storage medium storing computer program instructions that, when executed by a processor, cause the processor to perform one or more of the steps in the texture recognition method according to any one of the above embodiments.

Some embodiments of the present disclosure further provide a computer program product including computer program instructions that, when executed by a computer, cause the computer to perform one or more of the steps in the texture recognition method according to the above embodiments.

Some embodiments of the present disclosure further provide a computer program that, when executed by a computer, causes the computer to perform one or more of the steps in the texture recognition method according to the above embodiments.

The computer-readable storage medium, the computer program product and the computer program have the same beneficial effects as the display panel provided in the above embodiments, and details will not be repeated here.

Exemplarily, the computer-readable storage medium may include, but not limited to a magnetic storage device (e.g., a hard disk, a floppy disk, a magnetic tape, etc.), an optical disk (e.g., a compact disks (CD), a digital versatile disk (DVD), etc.), a smart card or a flash device (e.g., an erasable programmable read-only memory (EPROM), a card, a bar, a key driver, etc.). The computer-readable storage medium described may represent one or more devices for storing information and/or other machine-readable storage media. The term "computer-readable storage medium" may include, but not limited to a wireless channel and various other media capable of storing, containing and/or loading instructions and/or data.

As shown in FIG. 14, some embodiments of the present disclosure provide an electronic device 200. The electronic device 200 includes the display panel 10 according to any one of the above embodiments and the texture recognition device 100 according to the above embodiments. Here, the texture recognition device 100 is built in the electronic device 200, so the texture recognition device 100 is not shown in FIG. 14. The display panel 10 is coupled to the texture recognition device 100. When in use of the electronic device 200, the fingerprint of a finger can touch a fingerprint recognition region on the electronic device 200. Under the cooperation of the display panel 10 and the texture recognition device 100, the electronic device 200 realizes the texture recognition function.

Here, the electronic device 200 has the same beneficial effects as the display apparatus 10 and the texture recognition device 100 provided in the above some embodiments, and details will not be repeated here.

Similar to the display apparatus 30, the electronic device 200 provided in the embodiments of the present disclosure may be an electronic device such as a mobile device, a wireless device, a PAD, a handheld or portable computer, a GPS receiver/navigator, a camera, an MP4 video player, a video camera, a game console, a watch, a clock, a calculator, a TV monitor, a flat panel display, a computer monitor, a vehicle display, or a navigator.

In the description of the above implementations, the specific features, structures, materials or characteristics can be combined in a proper manner in any one or more embodiments or examples.

The foregoing descriptions are merely specific implementation manners of the present disclosure, but the protection scope of the present disclosure is not limited thereto. Any person of skill in the art could readily conceive of changes or replacements within the technical scope disclosed by the present disclosure, which shall all be included in the protection scope of the present disclosure. Therefore, the protection scope of the present disclosure shall be subject to the protection scope of the claims.

What is claimed is:

1. A display panel having a light-exit side and a non-light-exit side opposite to the light-exit side, a direction pointing to the non-light-exit side from the light-exit side being a first direction, along the first direction, the display panel comprising:
   a coded aperture mask layer, the coded aperture mask layer including a plurality of first light-transmission portions and a plurality of first light-shielding portions, the coded aperture mask layer being configured to form at least one part of a coded aperture array; and
   an optical sensing layer, the optical sensing layer including a plurality of optical sensors, the optical sensing layer being configured to receive texture recognition light passed through the coded aperture array and convert optical signals of the texture recognition light into electrical signals, wherein the texture recognition light is light that carries information about a texture to be recognized;
   the display panel further comprising:
   a coded aperture fit layer disposed on a side of the optical sensing layer proximate to the light-exit side, the coded aperture fit layer including a second light-transmission portion and a second light-shielding portion,
   wherein orthographic projections of the plurality of first light-shielding portions on a photosensitive surface of the optical sensing layer at least partially overlap an orthographic projection of the second light-transmission portion on the photosensitive surface of the optical sensing layer, so that the coded aperture mask layer cooperates with the coded aperture fit layer to form the coded aperture array;
   wherein the display panel is an active light-emitting display panel, and the active light-emitting display panel comprises:
   a first base; and
   a first pixel layer disposed above the first base, the first pixel layer including a plurality of light-emitting portions and a light-transmission pixel defining layer configured to isolate two adjacent light-emitting portions;
   the coded aperture fit layer includes at least one part of the first pixel layer, the plurality of light-emitting portions are configured to form the second light-shielding portion of the coded aperture fit layer, and the pixel defining layer is configured to form the second light-transmission portion of the coded aperture fit layer; and
   a side of the first pixel layer away from the first base is the light-exit side of the active light-emitting display panel, and the optical sensing layer is disposed on a side of the first pixel layer away from the light-exit side.

2. The display panel according to claim 1, wherein the coded aperture mask layer is located on a side of the first pixel layer proximate to the light-exit side,
   wherein the orthographic projections of the plurality of first light-shielding portions on the photosensitive surface are within an orthographic projection of the pixel defining layer on the photosensitive surface;
   orthographic projections of a part of the plurality of first light-transmission portions on the photosensitive surface are within the orthographic projection of the pixel defining layer on the photosensitive surface, and orthographic projections of another part of the plurality of first light-transmission portions on the photosensitive surface are within orthographic projections of the plurality of light-emitting portions on the photosensitive surface.

3. The display panel according to claim 1, wherein the coded aperture mask layer is located between the first pixel layer and the optical sensing layer,
   wherein orthographic projections of the plurality of light-emitting portions on the photosensitive surface overlap a part of the orthographic projections of the plurality of first light-shielding portions on the photosensitive surface, or orthographic projections of the plurality of light-emitting portions on the photosensitive surface overlap a part of orthographic projections of the plurality of first light-transmission portions on the photosensitive surface, or orthographic projections of the plurality of light-emitting portions on the photosensitive surface overlap a part of the orthographic projections of the plurality of first light-shielding portions on the photosensitive surface and a part of orthographic projections of the plurality of first light-transmission portions on the photosensitive surface.

4. The display panel according to claim 1, wherein the optical sensing layer is disposed between the first pixel layer and the first base; or,
   the optical sensing layer is disposed on a side of the first base away from the first pixel layer.

5. The display panel according to claim 4, wherein the active light-emitting display panel further comprises:
   a light blocking layer disposed on a side of the optical sensing layer away from the first pixel layer, the light blocking layer being configured to block light that enters the active light-emitting display panel from the non-light-exit side of the active light-emitting display panel.

6. The display panel according to claim 5, wherein orthographic projections of the plurality of optical sensors on the first base are within an orthographic projection of the light blocking layer on the first base.

7. The display panel according to claim 1, wherein the coded aperture mask layer is configured to form the coded aperture array.

8. The display panel according to claim 1, wherein the coded aperture mask layer includes:
   a light-transmission substrate; and
   a plurality of light-shielding coatings disposed on the substrate,
   wherein the plurality of light-shielding coatings are configured to form the plurality of first light-shielding portions, and portions of the substrate not covered with the plurality of light-shielding coatings are configured to form the plurality of first light-transmission portions.

9. The display panel according to claim 1, wherein the plurality of first light-transmission portions of the coded aperture mask layer are hollow structures.

10. A display apparatus, comprising the display panel according to claim 1.

11. A texture recognition method applied to the display panel according to the claim 1, the texture recognition method comprising:
receiving the electrical signals transmitted by the plurality of optical sensors in the optical sensing layer, the electrical signals being converted by the plurality of optical sensors from the optical signals of the texture recognition light passed through the coded aperture array;
obtaining an intermediate image of the texture to be recognized according to the electrical signals; and
performing image restoration on the intermediate image according to a matrix of the coded aperture array to obtain a texture image.

12. The texture recognition method according to claim 11, wherein performing image restoration on the intermediate image according to a matrix of the coded aperture array to obtain a texture image, includes:
calculating a matrix S of the texture image according to S=D*A−1,
where D represents a matrix of the intermediate image, A represents the matrix of the coded aperture array, A−1 represents an inverse matrix of A, and D*A−1 represents a convolution of D and A−1.

13. The texture recognition method according to claim 11, further comprising:
comparing the texture image with a pre-stored source image.

14. A non-transitory computer-readable storage medium storing computer program instructions that, when executed by a processor, cause the processor to perform one or more of steps in the texture recognition method according to claim 11.

15. An electronic device, comprising:
a display panel having a light-exit side and a non-light-exit side opposite to the light-exit side, a direction pointing to the non-light-exit side from the light-exit side being a first direction, along the first direction, the display panel including:
a coded aperture mask layer, the coded aperture mask layer including a plurality of first light-transmission portions and a plurality of first light-shielding portions, the coded aperture mask layer being configured to form at least one part of a coded aperture array; and
an optical sensing layer, the optical sensing layer including a plurality of optical sensors, the optical sensing layer being configured to receive texture recognition light passed through the coded aperture array and convert optical signals of the texture recognition light into electrical signals, wherein the texture recognition light is light that carries information about a texture to be recognized;
the display panel further comprising:
a coded aperture fit layer disposed on a side of the optical sensing layer proximate to the light-exit side, the coded aperture fit layer including a second light-transmission portion and a second light-shielding portion,
wherein orthographic projections of the plurality of first light-shielding portions on a photosensitive surface of the optical sensing layer at least partially overlap an orthographic projection of the second light-transmission portion on the photosensitive surface of the optical sensing layer, so that the coded aperture mask layer cooperates with the coded aperture fit layer to form the coded aperture array;
wherein the display panel is an active light-emitting display panel, and the active light-emitting display panel comprises:
a first base; and
a first pixel layer disposed above the first base, the first pixel layer including a plurality of light-emitting portions and a light-transmission pixel defining layer configured to isolate two adjacent light-emitting portions;
the coded aperture fit layer includes at least one part of the first pixel layer, the plurality of light-emitting portions are configured to form the second light-shielding portion of the coded aperture fit layer, and the pixel defining layer is configured to form the second light-transmission portion of the coded aperture fit layer; and
a side of the first pixel layer away from the first base is the light-exit side of the active light-emitting display panel, and the optical sensing layer is disposed on a side of the first pixel layer away from the light-exit side; and
a texture recognition device, the display panel being coupled to the texture recognition device, the texture recognition device including:
a signal receiver configured to receive the electrical signals transmitted by the plurality of optical sensors in the optical sensing layer, the electrical signals being converted by the plurality of optical sensors from the optical signals of the texture recognition light passed through the coded aperture array; and
a processor configured to obtain an intermediate image of the texture to be recognized according to the electrical signals and then perform image restoration on the intermediate image according to a matrix of the coded aperture array to obtain a texture image.

16. A display panel having a light-exit side and a non-light-exit side opposite to the light-exit side, a direction pointing to the non-light-exit side from the light-exit side being a first direction, along the first direction, the display panel comprising:
a coded aperture mask layer, the coded aperture mask layer including a plurality of first light-transmission portions and a plurality of first light-shielding portions, the coded aperture mask layer being configured to form at least one part of a coded aperture array; and
an optical sensing layer, the optical sensing layer including a plurality of optical sensors, the optical sensing layer being configured to receive texture recognition light passed through the coded aperture array and convert optical signals of the texture recognition light into electrical signals, wherein the texture recognition light is light that carries information about a texture to be recognized;
the display panel further comprising:
a coded aperture fit layer disposed on a side of the optical sensing layer proximate to the light-exit side, the coded aperture fit layer including a second light-transmission portion and a second light-shielding portion,
wherein orthographic projections of the plurality of first light-shielding portions on a photosensitive surface of the optical sensing layer at least partially overlap an orthographic projection of the second light-transmission portion on the photosensitive surface of the optical sensing layer, so that the coded aperture mask layer cooperates with the coded aperture fit layer to form the coded aperture array;

wherein the display panel is a passive light-emitting display panel, and the passive light-emitting display panel comprises:

a second base and a third base opposite to each other, and a liquid crystal layer disposed between the second base and the third base; and a plurality of filter portions disposed on a surface of the second base or the third base proximate to the liquid crystal layer, and a light-shielding pattern configured to isolate two adjacent filter portions, the plurality of filter portions are configured to form the second light-transmission portion of the coded aperture fit layer, and the light-shielding pattern is configured to form the second light-shielding portion of the coded aperture fit layer; and the third base is closer to the light-exit side of the passive light-emitting display panel than the second base, and the optical sensing layer is disposed on a side of the second base proximate to or away from the liquid crystal layer.

17. A display apparatus, comprising the display panel according to claim 16.

18. A texture recognition method applied to the display panel according to the claim 16, the texture recognition method comprising:

receiving the electrical signals transmitted by the plurality of optical sensors in the optical sensing layer, the electrical signals being converted by the plurality of optical sensors from the optical signals of the texture recognition light passed through the coded aperture array;

obtaining an intermediate image of the texture to be recognized according to the electrical signals; and performing image restoration on the intermediate image according to a matrix of the coded aperture array to obtain a texture image.

* * * * *

UNITED STATES PATENT AND TRADEMARK OFFICE
CERTIFICATE OF CORRECTION

| | | |
|---|---|---|
| PATENT NO. | : 11,386,692 B2 | |
| APPLICATION NO. | : 16/764951 | |
| DATED | : July 12, 2022 | |
| INVENTOR(S) | : Yangbing Li et al. | |

It is certified that error appears in the above-identified patent and that said Letters Patent is hereby corrected as shown below:

On the Title Page

Title page is included and has been updated with new renumbering of claims/drawing pages.

In the Drawings

Please insert the following replacement sheet of drawings depicting Figures 16 and 17 between pages 8 and 9 of the drawing pages.

Signed and Sealed this
Fifteenth Day of August, 2023

Katherine Kelly Vidal
*Director of the United States Patent and Trademark Office*

CERTIFICATE OF CORRECTION (continued)

(12) United States Patent
Li et al.

(10) Patent No.: US 11,386,692 B2
(45) Date of Patent: Jul. 12, 2022

(54) DISPLAY PANEL, DISPLAY APPARATUS, TEXTURE RECOGNITION METHOD AND ELECTRONIC DEVICE

(71) Applicant: BOE TECHNOLOGY GROUP CO., LTD., Beijing (CN)

(72) Inventors: Yangbing Li, Beijing (CN); Haisheng Wang, Beijing (CN); Xiaoliang Ding, Beijing (CN); Pengpeng Wang, Beijing (CN); Jiabin Wang, Beijing (CN); Ping Zhang, Beijing (CN); Likai Deng, Beijing (CN); Yapeng Li, Beijing (CN); Chihjen Cheng, Beijing (CN); Yanling Han, Beijing (CN); Xueyou Cao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 164 days.

(21) Appl. No.: 16/764,951

(22) PCT Filed: Nov. 5, 2019

(86) PCT No.: PCT/CN2019/115732
§ 371 (c)(1),
(2) Date: May 18, 2020

(87) PCT Pub. No.: WO2020/094016
PCT Pub. Date: May 14, 2020

(65) Prior Publication Data
US 2020/0349334 A1    Nov. 5, 2020

(30) Foreign Application Priority Data
Nov. 7, 2018   (CN) .......................... 201811321319.9

(51) Int. Cl.
*G02F 1/1335*  (2006.01)
*G06V 40/13*  (2022.01)
*G02F 1/1333*  (2006.01)

(52) U.S. Cl.
CPC ...... *G06V 40/1318* (2022.01); *G02F 1/13338* (2013.01); *G02F 1/133512* (2013.01)

(58) Field of Classification Search
CPC .............. G06K 9/0004; G02F 1/13338; G02F 1/133512; G06F 3/042; G06F 3/0304; G06V 40/1318
See application file for complete search history.

(56) References Cited

U.S. PATENT DOCUMENTS

2007/0263914 A1   11/2007  Tibbetts
2010/0183200 A1    7/2010  Wu
(Continued)

FOREIGN PATENT DOCUMENTS

CN    101400974 A    4/2009
CN    106970495 A    7/2017
(Continued)

OTHER PUBLICATIONS

Notification of the First Office Action issued in Chinese Patent Application 201811321319.9, dated Dec. 4, 2019; with English translation.
(Continued)

*Primary Examiner* — Antonio Xavier
(74) *Attorney, Agent, or Firm* — McDermott Will & Emery LLP

(57)   ABSTRACT

A display panel has a light-exit side and a non-light-exit side opposite to the light-exit side. A direction pointing to the non-light-exit side from the light-exit side is a first direction. In the first direction, the display panel includes a coded aperture mask layer and an optical sensing layer. The coded
(Continued)

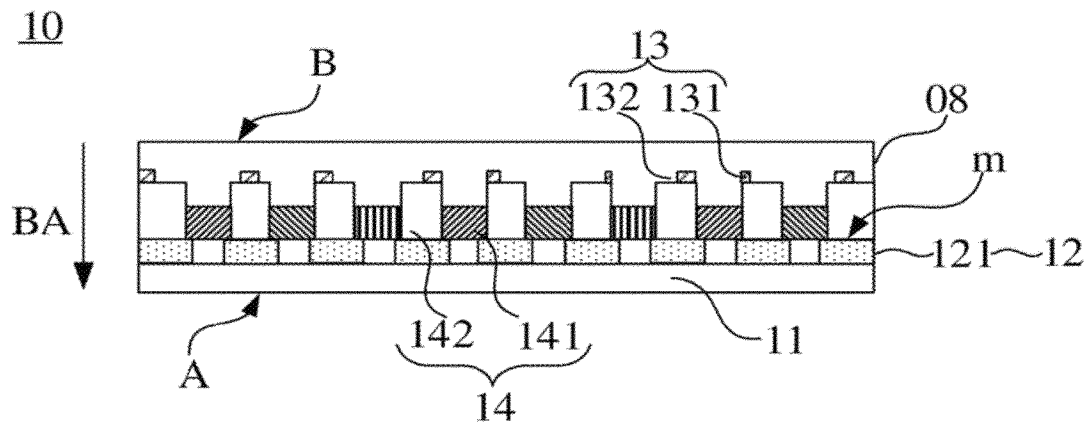

aperture mask layer includes a plurality of first light-transmission portions and a plurality of first light-shielding portions. The coded aperture mask layer is configured to form at least one part of a coded aperture array. The optical sensing layer includes a plurality of optical sensors. The optical sensing layer is configured to receive texture recognition light passed through the coded aperture array and convert optical signals of the texture recognition light into electrical signals. The texture recognition light is light carrying information about a texture to be recognized.

18 Claims, 11 Drawing Sheets

(56) References Cited

U.S. PATENT DOCUMENTS

| | | | | |
|---|---|---|---|---|
| 2017/0220840 A1* | 8/2017 | Wickboldt | | H01L 27/3234 |
| 2017/0220844 A1* | 8/2017 | Jones | | A61B 5/1172 |
| 2018/0076256 A1 | 3/2018 | Jiang et al. | | |
| 2018/0300525 A1 | 10/2018 | Fourre et al. | | |

FOREIGN PATENT DOCUMENTS

| | | |
|---|---|---|
| CN | 108496180 A | 9/2018 |
| CN | 108694379 A | 10/2018 |
| CN | 108764147 A | 11/2018 |
| EP | 0 886 958 B1 | 4/2001 |
| EP | 1 437 677 A1 | 7/2004 |
| EP | 3 367 301 A1 | 8/2018 |

OTHER PUBLICATIONS

Notification of the Second Office Action issued in Chinese Patent Application 201811321319.9, dated Jul. 24, 2020; with English translation.

* cited by examiner